United States Patent
Hamila et al.

(10) Patent No.: US 9,148,325 B2
(45) Date of Patent: Sep. 29, 2015

(54) SYSTEM AND METHODS FOR COMPENSATION OF I/Q IMBALANCE IN BEAMFORMING OFDM SYSTEMS

(71) Applicants: Ridha Hamila, Doha (QA); Ozgur Ozdemir, Doha (QA); Naofal Al-Dhahir, Dallas, TX (US)

(72) Inventors: Ridha Hamila, Doha (QA); Ozgur Ozdemir, Doha (QA); Naofal Al-Dhahir, Dallas, TX (US)

(*) Notice: Subject to any disclaimer, the term of this patent is extended or adjusted under 35 U.S.C. 154(b) by 0 days.

(21) Appl. No.: 13/900,535

(22) Filed: May 23, 2013

(65) Prior Publication Data

US 2013/0251057 A1  Sep. 26, 2013

(51) Int. Cl.
*H04L 27/00* (2006.01)
*H04L 27/26* (2006.01)

(52) U.S. Cl.
CPC ............................ *H04L 27/2646* (2013.01)

(58) Field of Classification Search
USPC ......... 375/140, 141, 147, 148, 260, 267, 285, 375/299, 346, 350; 455/63.1, 67.11, 67.13, 455/226.1, 296, 302; 329/318, 320, 353, 329/356
See application file for complete search history.

(56) References Cited

U.S. PATENT DOCUMENTS

| | | | |
|---|---|---|---|
| 8,478,222 B2* | 7/2013 | Wortel et al. | 455/233.1 |
| 2009/0046800 A1* | 2/2009 | Xu et al. | 375/267 |
| 2009/0093222 A1* | 4/2009 | Sarkar | 455/115.1 |
| 2009/0201794 A1* | 8/2009 | Luo et al. | 370/206 |
| 2010/0322350 A1* | 12/2010 | Malladi | 375/299 |
| 2012/0300818 A1* | 11/2012 | Metreaud et al. | 375/219 |

* cited by examiner

*Primary Examiner* — Dac Ha

(57) ABSTRACT

Disclosed are an system and method for compensation of I/Q imbalance in a beamforming OFDM system. The system comprises: a TX beamformer configured at a transmitter end of the beamforming OFDM system; a noise whitener configured at a receiver end of the beamforming OFDM system; and a RX MMSE configured at the receiver end of the beamforming OFDM system. At least one of the TX beamformer, the noise whitener and the RX MMSE receiver, or any combination thereof are capable of jointly processing a carrier and its image subcarrier to compensate the I/Q imbalance in the beamforming system.

17 Claims, 14 Drawing Sheets

Derivation of $\hat{\Psi}_n$ and $\hat{\Psi}_n^t$

The noise term $\hat{e}_n$ can be written as:

$$\hat{e}_n = F_K \bar{e}_n = F_K(\bar{\Delta}'_n \bar{d}_n + \bar{\Theta}'_n \bar{d}_n^*).$$

Given that $E[\bar{d}_n \bar{d}_n^H] = E[\bar{d}_n^* \bar{d}_n^T] = \sigma^2 I$ and $E[\bar{d}_n \bar{d}_n^T] = 0$, it is straightforward to obtain $$\hat{\Psi}_n = E[\hat{e}_n \hat{e}_n^H]$$
$$= \sigma^2 F_K \left( \bar{\Delta}'_n (\bar{\Delta}'_n)^H + \bar{\Theta}'_n (\bar{\Theta}'_n)^H \right) F_K^H$$

$$\hat{\Psi}_n^t = E[\hat{e}_n \hat{e}_n^T]$$
$$= \sigma^2 F_K \left( \bar{\Delta}'_n (\bar{\Theta}'_n)^T + \bar{\Theta}'_n (\bar{\Delta}'_n)^T \right) F_K^T.$$

FIG. 4

Derivation of Approximate SINR Expression

Using equations (24)-(25), we have $$E_{x,y}[A] = E_{x,y}[A_0] + a_1 E_x[A_1] + a_2 E_{x,y}[A_2],$$
$$E_{x,y}[B] = E_{x,y}[A_0] + b_1 E_y[B_1] + b_2 E_{x,y}[B_2] + \sigma_e^2.$$

First, we note that $$\begin{aligned} E_{x,y}[A_2] &= E_{x,y}\left[\frac{x^T y y^H x^*}{\|x\|^2}\right] \\ &= E_x\left[E_{y|x}\left[\frac{x^T y y^H x^*}{\|x\|^2}\mid x\right]\right] \\ &= E_x\left[\frac{x^T E_{y|x}[yy^H \mid x] x^*}{\|x\|^2}\right] \end{aligned} \quad (58)$$

Substituting (35) into (58) and after some manipulation we obtain:
$E_{x,y}[A_2] = (1 - |\rho_k|^2) + |\rho_k|^2 E_x\left[\frac{x^T x x^H x^*}{\|x\|^2}\right]$. By symmetry, we also have $E_{x,y}[B_2] = E_{x,y}[A_2]$. Let us define $X_i = |x(i)|^2$. Therefore, $X_1, \ldots, X_M$ are i.i.d. exponential random variables with $E[X_m] = 1$. Thus, $A_1 = \sum_{m=1}^M X_m$ and $E_x[A_1] = M$. Similarly, we can also show that $E_y[B_1] = M$. Furthermore, $E_{x,y}[A_0] = 2\text{Re}(a_3 E_{x,y}[x^T y])$ where $$E_{x,y}[x^T y] = E_x\left[E_{y|x}[x^T y \mid x]\right] = E_x\left[x^T E_{y|x}[y \mid x]\right].$$

Using (34), $E_{x,y}[x^T y] = \rho_k^* E_x[x^T x] = 0$. Therefore, $E_{x,y}[A_0] = 0$ As a result, to compute the approximate SINR as given by (36), we rewrite $$E_x\left[\frac{x^T x x^H x^*}{\|x\|^2}\right] = E\left[\frac{X_1^2 + \cdots + X_M^2}{X_1 + \cdots + X_M}\right] = Mg(M)$$
$$\text{where} \quad g(M) = E\left[\frac{X_1^2}{X_1 + \cdots + X_M}\right] \quad (59)$$

and all the terms with zero mean vanish. Using the identity $$\frac{X_1^2}{X_1 + \cdots + X_M} = X_1 - \frac{X_1(X_2 + \cdots + X_M)}{X_1 + \cdots + X_M}.$$
$$\text{we get} \quad g(M) = 1 - p(M) \quad (60)$$

where $p(M) = E\left[\frac{X_1(X_2+\cdots+X_M)}{X_1+\cdots+X_M}\right]$.

Note that $$p(M) = \int_0^\infty \cdots \int_0^\infty \frac{x_1(x_2 + \cdots + x_M)}{x_1 + \cdots + x_M} \exp(-x_1 - \cdots - x_M) dx_1 \cdots dx_M.$$

FIG. 5 (CONTINUED ON NEXT PAGE)

To perform this integral with respect to (w.r.t.) $x_1$, we get $$p(M) = \mathrm{E}\left[(\sum_{i=2}^{M} X_i)^2 \exp(\sum_{i=2}^{M} X_i)\mathrm{Ei}(\sum_{i=2}^{M} X_i) + (\sum_{i=2}^{M} X_i)\right]$$

where Ei(.) is the exponential integral function. Therefore $$p(M) = M - 1 + h_2(M) \qquad (61)$$

where $$h_N(M) = \mathrm{E}\left[(\sum_{i=N}^{M} X_i)^N \exp(\sum_{i=2}^{M} X_i)\mathrm{Ei}(-\sum_{i=2}^{M} X_i)\right]$$

for $N \leq M$. Equivalently $$h_N(M) = \int_0^\infty \cdots \int_0^\infty (x_N + \cdots + x_M)^N$$
$$\mathrm{Ei}(-x_2 - \cdots - x_M) dx_N \cdots dx_M.$$

By making the change of variable $x = x_N + x_{N+1} + \cdots + x_M$ for the integral w.r.t. $x_N$ $$h_N(M) = \int_0^\infty \cdots \int_0^\infty C dx_{N+1} \cdots dx_M. \qquad (62)$$

where $C = \int_{x_{N+1}+\cdots+x_M}^{\infty} x^N \mathrm{Ei}(-x) dx$.

Further, $$C = -\frac{(\sum_{i=N+1}^{M} x_i)^{N+1} \mathrm{Ei}(-\sum_{i=N+1}^{M} x_i)}{N+1}$$
$$-\frac{N!}{N+1} \exp(-\sum_{i=N+1}^{M} x_i) \sum_{k=0}^{N} \frac{(\sum_{i=N+1}^{M} x_i)^k}{k!}.$$

Therefore, $\quad h_N(M) = -\frac{1}{N+1} h_{N+1}(M) + f_N(M) \qquad (63)$ where $$f_N(M) = \mathrm{E}\left[-\frac{N!}{N+1} \sum_{k=0}^{N} \frac{(X_{N+1} + \cdots + X_M)^k}{k!}\right]$$
$$= -\frac{N!}{N+1} \sum_{k=0}^{N} \frac{q_{M-N}(k)}{k!}$$

and $q_L(k) = \mathrm{E}\left[(\sum_{i=N+1}^{N+L} X_i)^k\right] = \mathrm{E}\left[(\sum_{i=1}^{L} X_i)^k\right]$ is the $k$-th moment of the sum of $L$ i.i.d. exponential random variables. It can be shown that $Z = \sum_{i=1}^{L} X_i$ is a Gamma random variable with probability density function $p_Z(z) = \frac{z^{L-1}}{(L-1)!} \exp(-z), \quad z > 0$.

FIG. 5 (CONTINUED ON NEXT PAGE)

Therefore, $$q_L(k) = \mathrm{E}\left[Z^k\right] = \int_0^\infty \frac{z^k z^{L-1}}{(L-1)!}\exp(-z)dz = \frac{(k+L-1)!}{(L-1)!} \quad (64)$$

As a result, $$f_N(M) = -\frac{N!}{N+1}\sum_{k=0}^{N}\frac{(k+M-N-1)!}{k!(M-N-1)!}. \quad (65)$$

Finally, to compute $h_2(M)$ in (61), the recursive formula in (63) is used as follows $$h_2(M) = f_2(M) + \sum_{k=3}^{M-1}(-1)^k\frac{f_k(m)}{k} - \frac{h_M(M)}{M}$$

where $h_M(M)$ is found as:

$$h_M(M) = \int_0^\infty x_M^M \mathrm{Ei}(-x_M)dx_M = -\frac{M!}{M+1}. \quad (66)$$

Substituting from (61) into (60) we obtain $g(M) = 2 - M - h_2(M)$. Therefore, $$\begin{aligned}\mathrm{E}_{\mathbf{x},\mathbf{y}}[A] &= a_1 M + a_2\left[1 - |\rho_k|^2 + |\rho_k|^2 M g(M)\right], \\ \mathrm{E}_{\mathbf{x},\mathbf{y}}[B] &= b_1 M + b_2\left[1 - |\rho_k|^2 + |\rho_k|^2 M g(M)\right] + \sigma_e^2\end{aligned}$$

and the result in (37) is obtained.

FIG. 5 (CONTINUED)

SYSTEM AND METHODS FOR COMPENSATION OF I/Q IMBALANCE IN BEAMFORMING OFDM SYSTEMS

FIELD OF THE INVENTION

The present invention relates to system and methods for compensation of I/Q imbalance in beamforming OFDM systems.

BACKGROUND OF THE INVENTION

Most existing broadband wireless standards adopt some form of Orthogonal Frequency Division Multiplexing (also referred to as 'OFDM') as a transmission scheme. OFDM is a method of encoding digital data on multiple carrier frequencies. OFDM has developed into a popular scheme for wideband digital communication, whether wireless or over copper wires, used in applications such as digital television and audio broadcasting, DSL broadband internet access, wireless networks, and 4G mobile communications.

The primary advantage of OFDM over single-carrier schemes is its ability to cope with severe channel conditions (for example, attenuation of high frequencies in a long copper wire, narrowband interference and frequency-selective fading due to multipath) without complex equalization filters Channel equalization is simplified because OFDM may be viewed as using many slowly modulated narrowband signals rather than one rapidly modulated wideband signal. The low symbol rate makes the use of a guard interval between symbols affordable, making it possible to eliminate intersymbol interference (ISI) and utilize echoes and time-spreading (on analogue TV these are visible as ghosting and blurring, respectively) to achieve a diversity gain, i.e. a signal-to-noise ratio improvement. This mechanism also facilitates the design of single frequency networks (SFNs), where several adjacent transmitters send the same signal simultaneously at the same frequency, as the signals from multiple distant transmitters may be combined constructively, rather than interfering as would typically occur in a traditional single-carrier system. OFDM is disclosed at the website http://en.wikipedia.org/w/index.php?title=Orthogonal_frequency-division_multiplexing&oldid=546868144 and is incorporated herein in its entirety for reference purposes.

Traditionally, OFDM based wireless transceivers used the super heterodyne architecture which requires several analog components (filters and amplifiers) to achieve acceptable signal quality while increasing the overall power consumption and cost considerably. To overcome this drawback, the direct-conversion architecture where the radio frequency (RF) signal is converted directly to baseband, thus eliminating the bulky band-pass surface acoustic wave (SAW) filters, has gained increased popularity recently because it enables low-cost low-power integration in complementary metal oxide semiconductor (CMOS) technology leading to a smaller form factor. However, direct conversion OFDM-based broadband wireless transceivers suffer from several performance-limiting RF/analog impairments including Inphase/Quadrature imbalance (hereinafter referred to as 'I/Q imbalance'). As used herein, I/Q imbalance refers to the amplitude and phase mismatches between the in-phase (I) and quadrature (Q) branches at the transmit and receive sides. The I/Q imbalance is result of the impairments due to the front end analog parts of the transceivers. I/Q imbalance can degrade the performance of OFDM systems significantly.

Specifically, in direct-conversion transceivers, I/Q modulation and demodulation are performed in the analog domain. Ideally, I and Q branches of the mixers should have equal amplitude and 90 degrees phase shift but this is rarely the case in practice which results in inter-carrier interference (ICI) between the OFDM subcarriers. In addition, mismatches between the low-pass filters in I and Q branches result in FD I/Q imbalance.

Accordingly, there is a need for an improved system and a method that can compensate performance limiting RF/analog impairments including I/Q imbalance in beamforming OFDM systems in a reliable, power efficient and cost efficient manner.

SUMMARY OF THE INVENTION

In view of the foregoing disadvantages inherent in the prior-art, the general purpose of the present invention is to provide a system and method for compensation of I/Q imbalance in beamforming OFDM systems that is configured to include all advantages of the prior art and to overcome the drawbacks inherent in the prior art offering some added advantages.

In one aspect, the present invention provides a system for compensation of I/Q imbalance in a beamforming OFDM system. The system comprises: a TX beamformer configured at a transmitter end of the beamforming OFDM system; a noise whitener configured at a receiver end of the beamforming OFDM system; and a RX MMSE configured at the receiver end of the beamforming OFDM system. At least one of the TX beamformer, the noise whitener and the RX MMSE receiver, or any combination thereof are capable of jointly processing a carrier and its image subcarrier to compensate the I/Q imbalance in the beamforming system In another aspect, the present invention provides a method for compensation of I/Q imbalance in a beamforming OFDM system. The method comprises: sending pilot signals by a transmitter using two full OFDM symbols one at a time; estimating effective channel with I/Q imbalance parameters; feeding back the estimated channel to the transmitter; forming TX beamformer by the transmitter; forming a noise whitener; and forming a RX MMSE receiver for detection of the transmitted data symbols; and jointly processing a carrier and its image subcarrier to compensate the I/Q imbalance in the beamforming system.

These together with other objects of the invention, along with the various features of novelty that characterize the invention, are pointed out with particularity in the claims annexed hereto and forming a part of this disclosure. For a better understanding of the invention, its operating advantages and the specific objects attained by its uses, reference should be had to the accompanying drawings and descriptive matter in which there are illustrated exemplary embodiments of the present invention

BRIEF DESCRIPTION OF THE DRAWINGS

While the specification concludes with claims that particularly point out and distinctly claim the invention, it is believed that the advantages and features of the present invention will become better understood with reference to the following more detailed description of expressly disclosed exemplary embodiments taken in conjunction with the accompanying drawings. The drawings and detailed description which follow are intended to be merely illustrative of the expressly disclosed exemplary embodiments and are not intended to limit the scope of the present invention as set forth in the appended claims. In the drawings:

FIG. 4 illustrates derivation of auto-correlation matrices;

FIG. 5 illustrates derivation of approximate SINR expression;

DETAILED DESCRIPTION OF THE INVENTION

Figure 1:
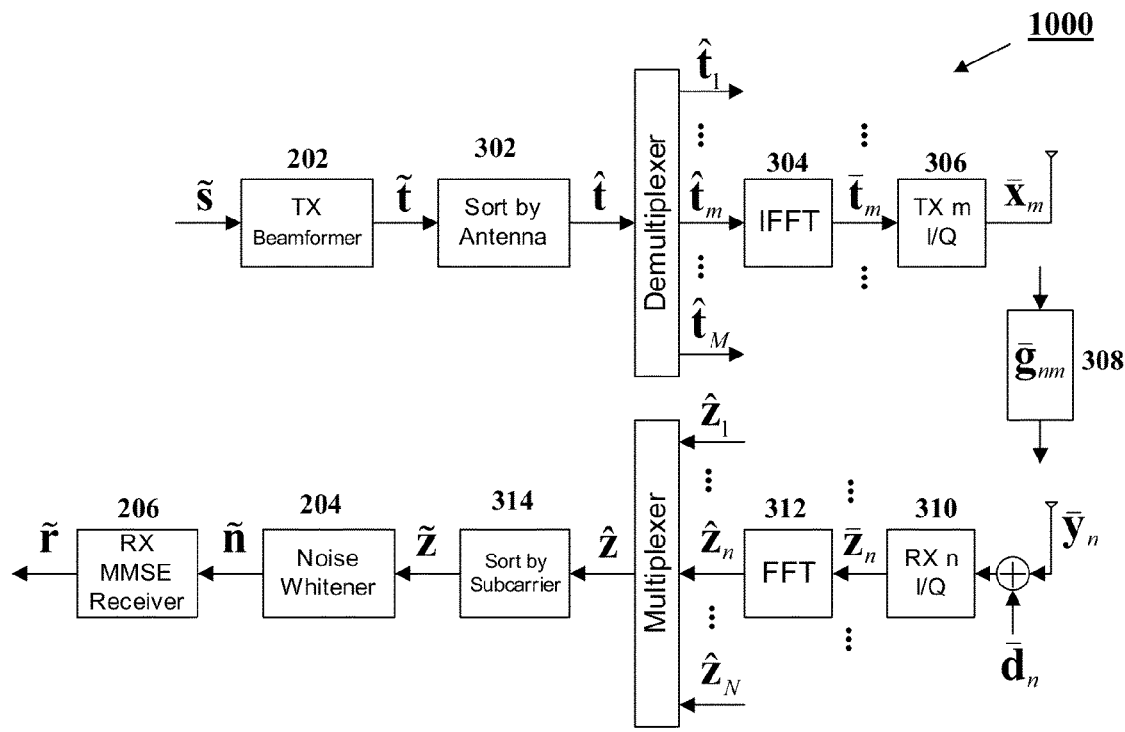
FIG. 1 illustrates a beamforming OFDM environment depicting the components of an system for compensation of I/Q imbalance in beamforming OFDM systems, according to an exemplary embodiment of the present invention.

The exemplary embodiments described herein detail for illustrative purposes are subject to many variations in structure and design. It should be emphasized, however, that the present invention is not limited to a particular system and methods for I/Q imbalance in beamforming OFDM systems, as shown and described. It is understood that various omissions and substitutions of equivalents are contemplated as circumstances may suggest or render expedient, but these are intended to cover the application or implementation without departing from the spirit or scope of the claims of the present disclosure. Also, it is to be understood that the phraseology and terminology used herein is for the purpose of description and should not be regarded as limiting.

The use of terms 'including', 'comprising', 'having' and variations thereof herein are meant to encompass the items listed thereafter and equivalents thereof as well as additional items. Further, the terms, 'a' and 'an' herein do not denote a limitation of quantity, but rather denote the presence of at least one of the referenced item.

The present invention provides system and method for compensation of I/Q imbalance in beamforming OFDM systems. The system and method are configured to effectively mitigates the effect of I/Q imbalance and frequency selective channel by joint processing of a subcarrier and its image subcarrier. In the presence of I/Q imbalance, there is an error floor when the conventional receiver is used. The system and method of the present invention are capable of removing the error floor and obtaining performance close to the ideal case without any I/Q imbalance.

Specifically, the joint processing implemented by the system and method of the preset invention in the beamforming system (also referred to as 'joint beamforming') and equalization scheme is different from the conventional I/Q imbalance-ignorant beamformer in that it performs joint processing of each subcarrier and its image to mitigate I/Q imbalance. The I/Q imbalance-ignorant beamformer assumes that the noise is still white and therefore does not perform noise whitening. The beamformer is designed based on a N×M channel matrix for the I/Q imbalance-ignorant beamformer whereas the beamformer according to an exemplary embodiment of the present invention is designed based on a 2N×2M channel matrix where N and M are the number of receiver and transmitter antennas, respectively.

The key variables and notations used in the description are described in the Table I below:

TABLE I

| Variable | Definition |
|---|---|
| M | Number of transmitters |
| N | Number of receivers |
| R | Number of beams |
| K | Number of subcarriers |
| ã | K R × 1 (K M × 1, K N × 1) frequency domain vector whose elements are ordered by subcarrier index |
| â | K M × 1 (K N × 1) frequency domain vector whose elements are ordered by antenna index |
| ā | K M × 1 (K N × 1) time domain vector whose elements are ordered by antenna index |
| Ā | K N × K M time domain matrix (N M block of K × K circulant matrices) |
| Â | K N × K M frequency domain matrix (N M block of K × K diagonal matrices) |
| À | K N × K M frequency domain block diagonal matrix with block size: N × M |
| Ḡ | K N × K M time domain physical channel matrix (N M block of K × K circulant matrices) |
| Ĝ | K N × K M frequency domain block diagonal physical channel matrix with block size N × M |
| Ā, Φ | K M × K M block diagonal I/Q imbalance parameters at the transmitter with K × K circulant blocks |
| Δ, Θ | K N × K N block diagonal I/Q imbalance parameters at the receiver with K × K circulant blocks |
| $z_k$ | 2N × 1 received signal vector from subcarriers k and k' |
| $\Gamma_k$ | 2N × 2M effective channel matrix for subcarriers k and k' |
| $s_k$ | 2R × 1 transmitted symbols vector from subarriers k and k' |
| $W_k$ | 2M × 2R beamforming weight matrix for subarriers k and k' |
| $\tilde{g}_k(x, y)$ | 1 × M physical channel vector for subarrier k when N = 1 (Note also that x = $\tilde{g}_k^H$, y = $\tilde{g}_{k'}^H$) |
| $\rho_k$ | Cross correlation between i-th element of x and i-th element of y |

Figure 1A:
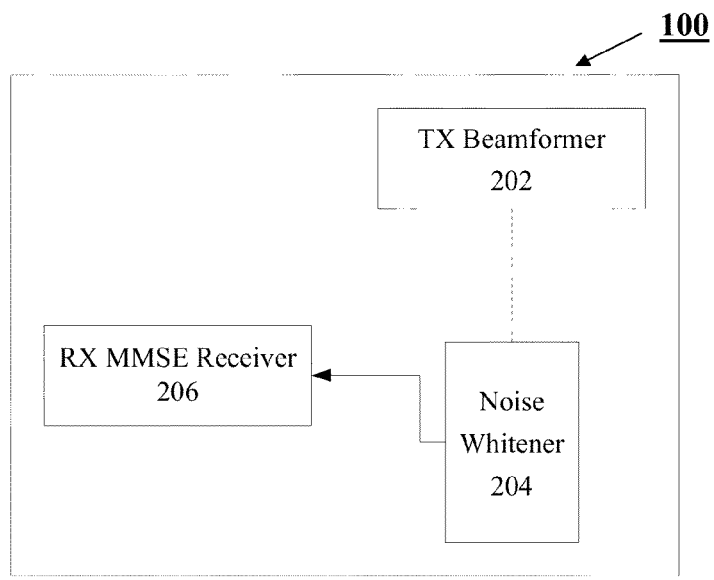
FIG. 1A illustrates the system for compensation of I/Q imbalance, according to an exemplary embodiment of the present invention.

Referring to FIGS. 1 and 1A which depict a beamforming OFDM environment 1000 impaired with I/Q imbalance implementing a system 100 for compensating I/Q imbalance, according to an exemplary embodiment of the present invention. In the FIG. 1, illustrated are the transmitter and receiver of the beamforming OFDM system impaired with I/Q imbalance.

Specifically, FIG. 1 illustrates a baseband representation of an actual OFDM system. Digital signal processing (also referred to as 'DSP') techniques are used to generate the output of the inverse fast Fourier transform (also referred to as 'IFFT') 304 at the transmitter, then the signal is upconverted to carrier frequency at the transmitter and back to the baseband at the receiver. The upconversion and downconversion are impaired with I/Q imbalance and these are modeled in baseband as TX I/Q 306 and Receiver RX I/Q 310. The FFT 312 and the remaining blocks 302, 308, 314 are implemented using DSP techniques at the receiver.

In one embodiment, as illustrated in FIG. 1A, a system 100 for compensation of I/Q imbalance in beamforming OFDM systems comprises: a TX beamformer 202 configured at a transmitter end of the beamforming OFDM system; a noise whitener 204 configured at a receiver end of the beamforming OFDM system; and a RX MMSE receiver 206 configured at the receiver end of the beamforming OFDM system. Specifically, the TX beamformer 202 is formed by the transmitter; and the noise whitener 204 and the RX MMSE receiver 206 is formed by the receiver. The conventional receivers ignore the I/Q imbalance and each subcarrier is processed separately which results in an error floor in bit error rate performance, however, as per the present invention, the TX beamformer 202, the noise whitener 204, and the RX MMSE receiver 206 components are capable of jointly processing a subcarrier and its image subcarrier to mitigate the effects of I/Q imbalance. The system 100 and below method 100 of the present invention is capable of removing the error floor and obtaining performance close to the ideal case where no I/Q imbalance exists.

In an embodiment, the TX beamformer 202 is adapted in the form of a precoder for the transmitted signal. Joint channel and I/Q imbalance parameters are estimated at the receiver using pilots and fed back to the transmitter. The transmitter optimizes the TX beamformer 202 in order to maximize the throughput. Pilot signals are sent by a transmitter with multiple antennas using two full OFDM symbols from one antenna at a time.

In an embodiment, the noise whitener 204 is adapted for noise whitening purposes at the receiver end. The noise entering the receiver is assumed to be white, however, due to the RX I/Q imbalance 310, the noise becomes coloured. The noise whitener 204 of the receiver processes the signal so that noise component becomes white again.

The RX MMSE receiver 206 along with the TX beamformer 202 and noise whitener 204 are capable of diagonalizing the channel for optimal detection of the transmitted signal. All the components TX beamformer 202, noise whitener 204 and RX MMSE receiver jointly process a subcarrier and its image subcarrier. Further, the RX MMSE receiver 206 is capable of generating an estimate of the transmitted data symbols.

An M transmit and N receive beamforming OFDM system affected by FD I/Q imbalance is depicted in FIG. 1 with perfect frequency and timing synchronization between the transmitter and receiver. As used herein and as illustrated in FIG. 1, $\tilde{s}=[\tilde{s}_1^T \ldots \tilde{s}_K^T]^T$ where K is the number of subcarriers and $\tilde{s}_k$ is the R×1 vector of information symbols at the subcarrier k. The parameter R≤min(M,N) is the number of transmitted beams per subcarrier used to increase the spatial multiplexing gain. The symbols at the output of the transmit beamformer are denoted by $\tilde{t}=[\tilde{t}_1^T \ldots \tilde{t}_K^T]^T$ where $\tilde{t}_k$ is the M×1 vector containing the signals for all transmitter branches at the $k^{th}$ subcarrier. The elements of $\tilde{t}$ are rearranged by a permutation matrix to obtain $\hat{t}=[\hat{t}_1^T \ldots \hat{t}_M^T]^T$ where $\hat{t}_m$ is the K×1 vector containing the signals for all the subcarriers at the $m^{th}$ transmitter branch. An IFFT operation 304 is performed at each transmitter branch to produce $\bar{t}=[t_1^T \ldots t_M^T]^T$ where $\bar{t}_m=F_K^H \hat{t}_m$, $F_K$ is the K×K unitary FFT matrix and $(.)^H$ denotes the complex-conjugate transpose operation.

Figure 2:
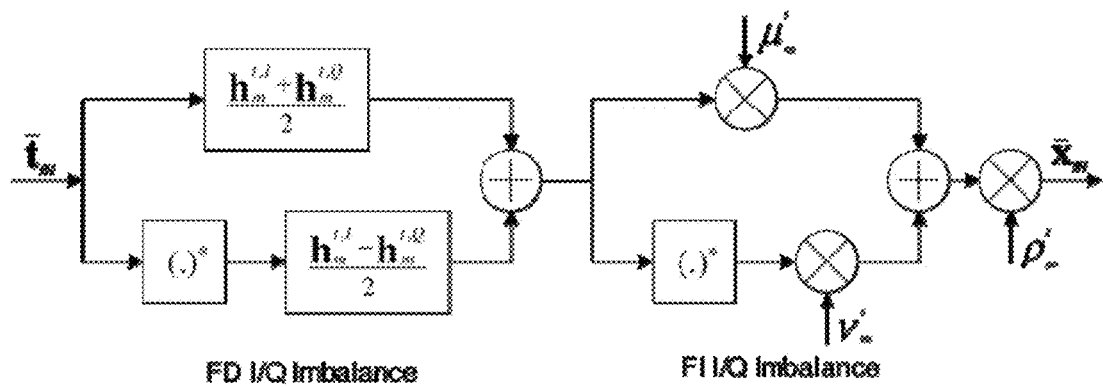
FIG. 2 illustrates a baseband equivalent TX I/Q imbalance model for the $m^{th}$ transmit antenna.
Figure 3:
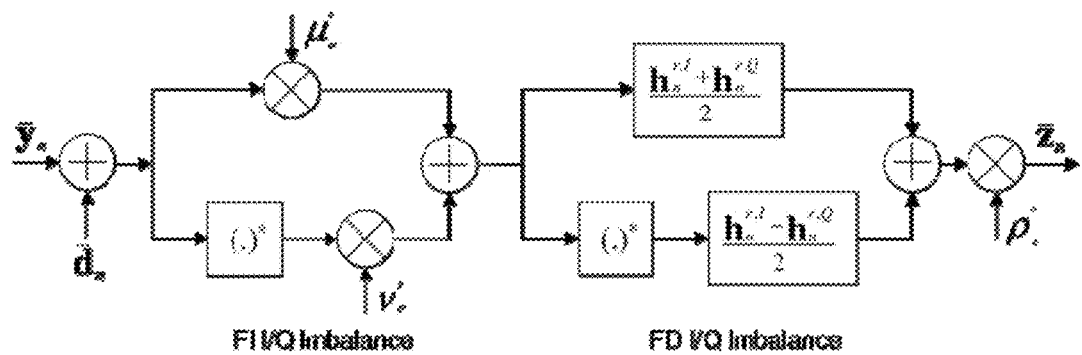
FIG. 3 illustrates a baseband equivalent RX I/Q imbalance model for the $n^{th}$ transmit antenna.

Referring to FIGS. 2 and 3, wherein FIG. 2 illustrates a baseband equivalent TX I/Q imbalance 306 model for the $m^{th}$ transmit antenna, and FIG. 3 illustrates a baseband equivalent RX I/Q imbalance 308 model for the $n^{th}$ transmit antenna. Considering that $h_m^{t,I}$ and $h_m^{t,Q}$ are the low-pass filters at the I and Q branches of the $m^{th}$ transmitter, respectively, representing the FD I/Q imbalance (ideally $h_m^{t,I}=h_m^{t,Q}$). Furthermore, considering that the mixer at the I branch uses the imbalanced carrier signal $(1+\alpha_m^t) \cos(2\pi f_c t+\beta_m^t/2)$ and the mixer at the Q branch uses $-(1-\alpha_m^t) \sin(2\pi f_c t-\beta_m^t/2)$. Ideally, the amplitude and phase imbalance parameters are $\alpha_m^t=0$, $\beta_m^t=0$. As a result, the TX I/Q imbalance effect 306 at baseband may be modeled as shown in FIG. 2, where:

$$\mu_m^t = \cos\left(\frac{\beta_m^t}{2}\right) - j\alpha_m^t \sin\left(\frac{\beta_m^t}{2}\right);$$

$$v_m^t = \alpha_m^t \cos\left(\frac{\beta_m^t}{2}\right) - j\sin\left(\frac{\beta_m^t}{2}\right).$$

Then, the signal at the $m^{th}$ TX antenna can be written as:

$$\bar{x}_m = \rho_m^t (\bar{\lambda}_m * \bar{t}_m + \bar{\phi}_m * \bar{t}_m^*) \quad (1)$$

where * denotes convolution, $(.)^*$ denotes the complex-conjugate operation, $$\bar{\lambda}_m = \mu_m^t \left(\frac{h_m^{t,I}+h_m^{t,Q}}{2}\right) + v_m^t \left(\frac{h_m^{t,I}-h_m^{t,Q}}{2}\right),$$

$$\bar{\phi}_m = \mu_m^t \left(\frac{h_m^{t,I}-h_m^{t,Q}}{2}\right) + v_m^t \left(\frac{h_m^{t,I}+h_m^{t,Q}}{2}\right),$$

and $\rho_m^t = (\bar{\lambda}_m^H \bar{\lambda}_m - \bar{\phi}_m^H \bar{\phi}_m)^{-1/2}$. Therefore, $\bar{t}_m$ and $\bar{x}_m$ have equal power (ideally $\bar{\lambda}_m=1$, $\bar{\phi}_m=0$).

The transmitted and received signals are denoted by $\bar{x}=[\bar{x}_1^T \ldots \bar{x}_M^T]^T$ and $\bar{y}=[\bar{y}_1^T \ldots \bar{y}_N^T]^T$, respectively, where $\bar{y}_n$ is the K×1 received signal at the $n^{th}$ RX antenna given by $\bar{y}_n = \sum_{m=1}^M \bar{g}_{nm} * \bar{x}_m$ where $\bar{g}_{nm}$ is the slow-fading channel impulse response (also referred to as 'CIR') vector between the $m^{th}$ transmitter and the $n^{th}$ receiver. It is assumed that the channel remains constant during its coherence time.

At the receiver side, assume that $h_n^{r,I}$ and $h_n^{r,Q}$ are the low-pass filters at the I and Q branches of the $n^{th}$ receiver branch, respectively. It is assumed that the mixer at the I branch uses the imbalanced signal $(1+\alpha_m^r) \cos(2\pi f_c t+\beta_m^r/2)$ while the mixer at the Q branch uses $-(1-\alpha_m^r) \sin(2\pi f_c t-\beta_m^r/2)$. Therefore, the RX I/Q imbalance 310 effect may be modelled at baseband as shown in FIG. 3 where the RX I/Q imbalance 310 parameters are given by:

$$\mu_n^r = \cos\left(\frac{\beta_n^r}{2}\right) + j\alpha_n^r \sin\left(\frac{\beta_n^r}{2}\right);$$

$$v_n^r = \alpha_n^r \cos\left(\frac{\beta_n^r}{2}\right) - j\sin\left(\frac{\beta_n^r}{2}\right).$$

Then, the received time-domain signal after being distorted by I/Q imbalance is given by:

$$\bar{z}_n = \rho_n^r(\bar{\delta}_n * \bar{y}_n + \bar{\theta}_n * \bar{y}_n^*) + \bar{e}_n \qquad (2)$$

where $$\bar{\delta}_n = \mu_n^r\left(\frac{h_n^{r,I} + h_n^{r,Q}}{2}\right) + (v_n^r)^*\left(\frac{h_n^{r,I} - h_n^{r,Q}}{2}\right), \qquad (3)$$

$$\bar{\theta}_n = (\mu_n^r)^*\left(\frac{h_n^{r,I} - h_n^{r,Q}}{2}\right) + v_n^r\left(\frac{h_n^{r,I} + h_n^{r,Q}}{2}\right),$$

$$\rho_n^r = (\bar{\delta}_n^H \bar{\delta}_n + \bar{\theta}_n^H \bar{\theta}_n)^{-1/2},$$

$$\bar{e}_n = \bar{\delta}_n * \bar{d}_n + \bar{\theta}_n * \bar{d}_n^*,$$

and $\bar{d}_n$ is the complex circularly-symmetric additive white Gaussian noise (AWGN) vector whose elements have zero mean and variance $\sigma^2$.

Now referring to the matrix representation, because there is no cyclic prefix (CP) for the noise term, $\bar{d}_n$ is linearly convolved with the filter $\bar{\delta}_n$ on the I branch and its conjugate is linearly convolved with the filter $\bar{\theta}_n$ on the Q branch and both branches are added up to form $\bar{e}_n$. Therefore, above-mentioned equation (3) may be written in matrix form as follows:

$$\bar{e}_n = \bar{\Delta}'_n \bar{d}_n + \bar{\Theta}'_n \bar{d}_n^* \qquad (4)$$

where $\bar{\Delta}'_n$ and $\bar{\Theta}'_n$ are K×(K+L) linear convolution Toeplitz matrices formed using the and $\bar{\delta}_n$ and $\bar{\theta}_n$, respectively, and L is the CP length. The k-th row of $\bar{\Delta}'_n$ is given by:

$$[0_{1\times(k+L-L_{\bar{\delta}_n})} \quad fliplr(\bar{\delta}_n^T) \quad 0_{1\times(K-k)}]$$

where $L_{\bar{\delta}_n}$ is the length of $\bar{\delta}_n$ and the fliplr(.) operation returns a vector of the same length with the order of its elements reversed. $\bar{\Theta}'_n$ is defined similarly. Due to the CP insertion process, the linear convolution of the low-pass filters and the channel with the signal term becomes circular convolution assuming that L is chosen large enough. Hence, the following matrix model is obtained $$\bar{z} = \bar{A}\bar{t} + \bar{B}\bar{t}^* + \bar{e} \qquad (5)$$

where $$\bar{z} = [\bar{z}_1^T \ldots \bar{z}_N^T]^T, \bar{e} = [\bar{e}_1^T \ldots \bar{e}_N^T]^T, \text{ and}$$

$$\bar{A} = [\bar{A}_{11} \ldots \bar{A}_{1M}; \ldots; \bar{A}_{N1} \ldots \bar{A}_{NM}], \qquad (6)$$

$$\bar{B} = [\bar{B}_{11} \ldots \bar{B}_{1M}; \ldots; \bar{B}_{N1} \ldots \bar{B}_{NM}], \qquad (7)$$

$$\bar{A}_{nm} = \bar{\Delta}_n \bar{G}_{nm} \bar{\Lambda}_m + \bar{\Theta}_n \bar{G}^*_{nm} \bar{\Phi}^*_m, \qquad (8)$$

$$\bar{B}_{nm} = \bar{\Delta}_n \bar{G}_{nm} \bar{\Phi}_m + \bar{\Theta}_n \bar{G}^*_{nm} \bar{\Lambda}^*_n, \qquad (9)$$

The circulant matrices $\bar{\Delta}_n$, $\bar{\Theta}_n$, $\bar{\Lambda}_m$, $\bar{\Phi}_m$, and $\bar{G}_{nm}$ are generated from the vectors $\bar{\delta}_n$, $\bar{\theta}_n$, $\bar{\lambda}_m$, $\bar{\phi}_m$, and $\bar{g}_{nm}$, respectively. Further, $\bar{A}_{nm}$ and $\bar{B}_{nm}$ are also circulant matrices.

As used herein, $\hat{x}_m^\#$ is defined as the FFT of $\bar{x}^*_m$ ($\hat{x}_m^\# = F_K \bar{x}^*_m$). Therefore, the $k^{th}$ element of $\hat{x}_m^\#$ is the conjugate of the (k'=K−k+2) element of $\hat{x}_m$ for k=2, ..., K. In addition, the first (resp. K/2+1) element of $\hat{x}_m^\#$ is the conjugate of the first (resp. K/2+1) element of $\hat{x}_m$. As a result, for the rest of the description, each subcarrier k in the set {2, ..., K/2} is coupled to its image subcarrier k' in the set {K, ..., K/2+2}. Furthermore, if a K×K diagonal matrix $\hat{X}$ is equal to $F_K \bar{X} F_K^H$ for some circulant matrix $\bar{X}$, then $\hat{X}^\# = F_K \bar{X}^* F_K^H$ is defined as where $\hat{X}^\#$ is still diagonal and diag($\hat{X}^\#$)= [diag($\hat{X}$)]$^\#$.

Taking the FFT of $\bar{z}$ in equation (5), replacing $\bar{t}_m$ with $F_K^H \hat{t}_m$ and $\bar{t}^*_m$ with $F_K^H \hat{t}_m^\#$, and after some manipulations it can be written:

$$\hat{z} = \hat{A}\hat{t} + \hat{B}\hat{t}^\# + \hat{e} \qquad (10)$$

where $$\hat{z} = [\hat{z}_1^T \ldots \hat{z}_N^T]^T, \hat{z}_n = F_K \bar{z}_n,$$

$$\hat{A} = [\hat{A}_{11} \ldots \hat{A}_{1M}; \ldots; \hat{A}_{N1} \ldots \hat{A}_{NM}],$$

$$\hat{B} = [\hat{B}_{11} \ldots \hat{B}_{1M}; \ldots; \hat{B}_{N1} \ldots \hat{B}_{NM}], \qquad (11)$$

The matrices $\hat{A}_{nm} = F_K \bar{A}_{nm} F_K^H$ and $\hat{B}_{nm} = F_K \bar{B}_{nm} F_K^H$ are diagonal matrices, $\hat{t}^\# = [\hat{t}_1^{\#T} \ldots \hat{t}_N^{\#T}]^T$, $\hat{e} = [\hat{e}_1^T \ldots \hat{e}_N^T]^T$, and $\hat{e}_n = F_K \bar{e}_n$. Rearranging the elements of $\hat{z}$ by a permutation matrix to align terms with the same subcarrier it is obtained $$\tilde{z} = \tilde{A}\tilde{t} + \tilde{B}\tilde{t}^\# + \tilde{e}, \qquad (12)$$

where $$\tilde{z} = [\tilde{z}_1^T \ldots \tilde{z}_K^T]^T,$$

$$\tilde{z}_k = [\hat{z}_1(k); \ldots; \hat{z}_N(k)] \text{ or } \tilde{z}_k(n) = \hat{z}_n(k),$$

$$\tilde{A} = \text{diag}(\tilde{A}_1, \ldots, \tilde{A}_K),$$

$$\tilde{A}_k(n,m) = \hat{A}_{nm}(k,k),$$

$$\tilde{B} = \text{diag}(\tilde{B}_1, \ldots, \tilde{B}_K),$$

$$\tilde{B}_k(n,m) = \hat{B}_{nm}(k,k),$$

$$\tilde{e} = [\tilde{e}_1^T \ldots \tilde{e}_K^T]^T,$$

$$\tilde{e}_k(n) = \hat{e}_n(k), \text{ and}$$

$$\tilde{t}^\# = [\tilde{t}_1^H \tilde{t}_K^H \ldots \tilde{t}_{K-k+2}^H \ldots \tilde{t}_2^H]^T$$

Herein, the received signal at subcarrier k is not only composed of the transmitted signal at subcarrier k but also the transmitted signal at subcarrier k'. Therefore, signals are detected jointly at subcarriers k and k'. Furthermore, it is assumed that no data is transmitted at subcarriers k=1 and k=K/2+1. Generally, in standardized OFDM systems, these two subcarriers do not carry information due to implementation issues. The received signal vectors of sizes N×1 at subcarriers k and k' may be written as:

$$\tilde{z}_k = \tilde{A}_k \tilde{t}_k + \tilde{B}_k \tilde{t}^*_{k'} + \tilde{e}_k, \qquad (13)$$

$$\tilde{z}_{k'} = \tilde{A}_{k'} \tilde{t}_{k'} + \tilde{B}_{k'} \tilde{t}^*_k + \tilde{e}_{k'} \qquad (14)$$

which can be combined in matrix form as follows:

$$z_k = \Gamma_k t_k + e_k, \qquad (15)$$

where $$z_k = [\tilde{z}_k^T \tilde{z}_{k'}^H]^T,$$

$$t_k = [\tilde{t}_k^T \tilde{t}_{k'}^H]^T,$$

$$e_k = [\tilde{e}_k^T \tilde{e}_{k'}^H]^T, \text{ and}$$

$$\Gamma_k = [\tilde{A}_k \tilde{B}_k; \tilde{B}^*_k \tilde{A}^*_{k'}]$$

Referring to transmit beamformer, since the received signal at subcarrier k experiences interference from the signal at subcarrier k', it is considered the following transmit beamformer (or precoder) structure:

$$\tilde{t} = \tilde{\Omega}\tilde{s} + \tilde{\Sigma}\tilde{s}^\# \quad (16)$$

where $$\tilde{\Omega} = \text{diag}(\tilde{\Omega}_1, \ldots, \tilde{\Omega}_K),$$

$$\tilde{\Xi} = \text{diag}(\tilde{\Xi}_1, \ldots, \tilde{\Xi}_K), \text{ and } \tilde{\Omega}_k \text{ and } \tilde{\Xi}_k \text{ are M} \times \text{R matrices.}$$

Therefore, it can be written that:

$$t_k = W_k s_k$$

where $W_k = [\tilde{\Omega}_k \tilde{\Xi}_k; \tilde{\Xi}^*_k \tilde{\Omega}^*_{k'}]$ and $[\tilde{s}_k^T \tilde{s}_{k'}^H]^T$.

The auto-correlation matrix of the error vector $e_k$ in above-mentioned equation (15) is given by:

$$\Psi_k = E[e_k e_k^H] = \begin{bmatrix} E[\tilde{e}_k \tilde{e}_k^H] & E[\tilde{e}_k \tilde{e}_{k'}^T] \\ E[\tilde{e}^*_{k'} \tilde{e}_k^H] & E[\tilde{e}^*_{k'} \tilde{e}_{k'}^T] \end{bmatrix} \quad (17)$$

where $$E[\tilde{e}_k \tilde{e}_{k'}^T] = \text{diag}(\hat{\Psi}_1^t(k,k'), \ldots, \hat{\Psi}_N^t(k,k')),$$

$$E[\tilde{e}^*_k \tilde{e}_k^H] = \text{diag}(\hat{\Psi}_1^t(k,k'), \ldots, \hat{\Psi}_N^t(k,k')),$$

$E[\tilde{e}^*_k \tilde{e}_k^H] = \text{diag}(\hat{\Psi}_1^t(k',k)^*, \ldots, \hat{\Psi}_N^t(k',k)^*),$
$E[\tilde{e}^*_k \tilde{e}_{k'}^T] = \text{diag}(\hat{\Psi}_1(k',k'), \ldots, \hat{\Psi}_N(k',k'))$ and the matrices $\hat{\Psi}_n = E[\hat{e}_n \hat{e}_n^H]$ and $\hat{\Psi}_n^t = E[\hat{e}_n \hat{e}_n^T]$ are derived as illustrated in FIG. 4.

Now, the impact of I/Q imbalance on the average subcarrier SINR of I/Q imbalance-ignorant beamformer is analyzed. To simplify the analysis, it is assumed a single receive antenna (N=1), single beamforming (R=1), and FI I/Q imbalance at the transmitter and receiver is considered. Furthermore, it is assumed that all transmitter branches share the same local oscillator, and therefore, have the same I/Q imbalance parameters. The assumption is only valid if mixers used in different transmitters are ideal. Under these assumptions, equation (1) may be rewritten as:

$$\bar{x}_m = \lambda \bar{t}_m + \phi \bar{t}^*_m, \ m=1,\ldots,M \quad (18)$$

where $\lambda$ and $\phi$ are the I/Q imbalance parameters common to all M transmitter branches.

Furthermore, the equation (2) may be expressed as:

$$\bar{z}_1 = \delta \bar{y}_1 + \theta \bar{y}^*_1 + \delta \bar{d}_1 + \theta \bar{d}^*_1 \quad (19)$$

where $\delta$ and $\theta$ are the I/Q imbalance parameters at the single receiver branch. The scalar received signal at subcarrier k given by the equation (13) contains both the desired signal, the interference, and the noise term. Under the assumptions given above, $\bar{A}$ in the equation (6) becomes:

$$\bar{A} = [\bar{A}_{11} \ldots \bar{A}_{1M}] \text{ where } \bar{A}_{1m} = \delta \lambda \bar{G}_{1m} + \theta \phi^* \bar{G}^*_{1m}.$$

Furthermore:

$$\hat{A} = [\hat{A}_{11} \ldots \hat{A}_{1M}] \text{ where } \hat{A}_{1m} = \delta \lambda \hat{G}_{1m} + \theta \phi^* \hat{G}^\#_{1m}.$$

Defining the $1 \times M$ channel vector at the k-th subcarrier, $\tilde{g}_k$, where: $\tilde{g}_k(m) = \hat{G}_{1m}(k,k)$ and noting that $\hat{G}_{1m}^\#(k,k) = (\hat{G}_{1m}(k',k'))^*$, $\tilde{A}_k$ and $\tilde{B}_1$ in the equation (13) become $$\tilde{A}_k = \delta \lambda \tilde{g}_k + \theta \phi^* \tilde{g}^*_{k'} \text{ and } \tilde{B}_k = \delta \phi \tilde{g}_k + \theta \lambda^* \tilde{g}^*_{k'}. \quad (20)$$

The I/Q imbalance-ignorant beamformer does not take I/Q imbalance into consideration. Therefore, the beamforming weights in the equation (16) become $$\tilde{\Xi}_k = 0_{M \times 1}, \tilde{\Omega}_k = \tilde{g}_k^H / \|\tilde{g}_k\|,$$

and $\tilde{t}_k$ and $\tilde{t}_{k'}$ in the equation (13) are given by:

$$\tilde{t}_k = \frac{\tilde{g}_k^H}{\|\tilde{g}_k\|} \tilde{s}_k, \text{ and } \tilde{t}_{k'} = \frac{\tilde{g}_{k'}^H}{\|\tilde{g}_{k'}\|} \tilde{s}_{k'}.$$

As a result, equation (13) can be written as follows $$\tilde{z}_k = \left(\delta \lambda \|\tilde{g}_k\| + \theta \phi^* \frac{\tilde{g}^*_{k'} \tilde{g}^H_k}{\|\tilde{g}_k\|}\right) \tilde{s}_k + \left(\delta \phi \frac{\tilde{g}_k \tilde{g}^T_{k'}}{\|\tilde{g}_{k'}\|} + \theta \lambda^* \|\tilde{g}_{k'}\|\right) \tilde{s}^*_{k'} + \tilde{e}_k \quad (21)$$

where $\tilde{e}_k = \delta \hat{d}_1(k) + \theta \hat{d}_1(k')$, and $\hat{d}_1 = F_K \bar{d}_1$ so that $E[|\tilde{e}_k|^2] = (|\delta|^2 + |\theta|^2) \sigma^2 \equiv \sigma_e^2$.

When there is no I/Q imbalance, the equation (21) reduces to the well-known relation $\tilde{z}_k = \|\tilde{g}_k\| \tilde{s}_k + \tilde{e}_k$.

To simplify the notation, let us define the $M \times 1$ spatial channel vectors at the k-th subcarrier and its image by $x = \tilde{g}_k^H$ and $y = \tilde{g}_{k'}^H$, respectively. Then, the equation (21) becomes:

$$\tilde{z}_k = \left(\delta \lambda \|x\| + \theta \phi^* \frac{y^T x}{\|x\|}\right) \tilde{s}_k + \left(\delta \phi \frac{x^H y^*}{\|y\|} + \theta \lambda^* \|y\|\right) \tilde{s}^*_{k'} + \tilde{e}_k. \quad (22)$$

Accordingly, the average SINR at the k-th subcarrier is given by:

$$SINR_k = E_{x,y}\left[\frac{A}{B}\right] \quad (23)$$

where $$A = A_0 + \underbrace{a_1 \|x\|^2}_{A_1} + \underbrace{a_2 \frac{x^T y y^H x^*}{\|x\|^2}}_{A_2}, \quad (24)$$

$$B = A_0 + \underbrace{b_1 \|y\|^2}_{B_1} + \underbrace{b_2 \frac{y^T x x^H y^*}{\|y\|^2}}_{B_2} + \sigma_e^2, \quad (25)$$

and $A_0 = 2\text{Re}(a_3 x^T y)$. The constants $a_1, a_2, a_3, b_1,$ and $b_2$ are given by: $a_1 = P|\delta|^2|\lambda|^2$, $a_2 = P|\theta|^2|\phi|^2$, $a_3 = P\delta^*\lambda^*\theta\phi^*$, $b_1 = P|\theta|^2|\lambda|^2$, and $b_2 = P|\delta|^2|\phi|^2$ where $P = E[|\tilde{s}_k|^2]$. The expectation in the equation (23) is taken over the random channel vectors x and y only.

It is assumed that the elements of the $1 \times 1$ time-domain CIR vector, $\bar{g}_{1m}$, are i.i.d. circularly symmetric complex Gaussian random variables. The vector $\bar{g}_{1m}$ has zero mean and covariance matrix $$E[\bar{g}_{1m} \bar{g}_{1m}^H] = \text{diag}\{\sigma_1^2, \ldots, \sigma_L^2\} \quad (26)$$

where $\Sigma_{l=1}^L \sigma_l^2 = 1$. Moreover, it is assumed that different antennas have uncorrelated channel vectors. By using MATLAB notation, it can be shown that:

$$\text{diag}\{\hat{G}_{1m}\} = \sqrt{K} F_K[0_{(K-L)\times 1} \ \bar{g}_{1m}] \quad (27)$$

$$= \sqrt{K} F_K(:,1:L) \bar{g}_{1m}. \quad (28)$$

Therefore, the m-th element of $\tilde{g}_k$ is equal to:

$$\tilde{g}_k(m) = \hat{G}_{1m}(k,k) = \sqrt{K} F_K(k,1:L) \bar{g}_{1m} \quad (29)$$

and $x = \tilde{g}_k^H$ can be written as:

$$x = [\bar{g}_{11}^H f_k \ldots \bar{g}_{1M}^H f_k]^T \quad (30)$$

where $f_k = \sqrt{K}(F_K(k, 1:L))^H$ is an $L \times 1$ non-random vector. Similarly, $y = \tilde{g}_{k'}^H$ is given by $$y = [\bar{g}_{11}^H f_{k'} \ldots \bar{g}_{1M}^H f_{k'}]^T \quad (31)$$

The correlation between the elements of x is given by:

$$E[x(m)x^*(n)] = E[\bar{g}_{1m}^H f_k f_k^H \bar{g}_{1n}] \quad (32)$$
$$= f_k^H E[\bar{g}_{1n}\bar{g}_{1m}^H] f_k$$
$$= \delta_{n-m} f_k^H \text{diag}\{\sigma_1^2, \ldots, \sigma_L^2\} f_k$$
$$= \delta_{n-m}.$$

where the property $f_k(l)^* f_k(l) = 1$ was used. Thus, $E[xx^H] = I_M$. Similarly, the cross-correlation matrix between x and y is $E[xy^H] = \rho_k I_M$ where $$\rho_k = f_k^H \text{diag}\{\sigma_1^2, \ldots, \sigma_L^2\} f_k \quad (33)$$
$$= \sum_{l=1}^{L} \sigma_l^2 f_{k'}(l)^* f_k(l).$$

The following relations will be useful in the SINR analysis of the next subsection. From equations (30) and (31), the vectors x and y are jointly Gaussian. Hence, the mean vector and covariance matrix of y conditioned on x can be computed as follows equation:

$$E[y|x] = E[yx^H]E[xx^H]^{-1}x = \rho_k^* x, \quad (34)$$
$$C_{y|x} = E[(y - E[y|x])(y - E[y|x])^H | x]$$
$$= E[yy^H] - E[yx^H]E[xx^H]^{-1}E[xy^H]$$
$$= (1 - |\rho_k|^2)I.$$

Therefore, $$E[yy^H | x] = C_{y|x} + E[y|x]E[y|x]^H \quad (35)$$
$$= (1 - |\rho_k|^2)I + |\rho_k|^2 xx^H.$$

Now, describing the average subcarrier SINR expression derivation, generally, it is difficult to calculate the exact average SINR expression as defined by equation (23), however, an approximate average SINR expression can be defined as:

$$SINR_k \approx \frac{E_{x,y}[A]}{E_{x,y}[B]}. \quad (36)$$

Referring to FIG. 5, illustrated is derivation of approximate SINR expression as follows:

$$\frac{E_{x,y}[A]}{E_{x,y}[B]} = \frac{a_1 M + a_2[1 - |\rho_k|^2 + |\rho_k|^2 Mg(M)]}{b_1 M + b_2[1 - |\rho_k|^2 + |\rho_k|^2 Mg(M)] + \sigma_e^2} \quad (37)$$

where $g(M) = 2 - M - h_2(M)$ and $h_2(M)$ is calculated using the recursion in below described equation (63) along with equations (65) and (66). In practice $\alpha_2 \ll \alpha_1$; therefore, the second term in the numerator can be ignored.

Now, the magnitude of the spatial channel cross-correlation coefficient between subcarrier k and its image $|\rho_k|$ is investigated by considering the following ratio of the average SINR at $|\rho_k|=0$ to its value at $|\rho_k|=1$. For simplicity, it is assumed equal I/Q imbalances at the transmitter and the receiver i.e., $$|\mu|^2 = |\delta|^2 = |\lambda|^2 \text{ and } |\nu|^2 = |\theta|^2 = |\phi^2|$$

$$\frac{SINR_k(|\rho_k|=0)}{SINR_k(|\rho_k|=1)} \approx \frac{|\mu|^2|\nu|^2(M + Mg(M)) + \frac{1}{SNR}}{|\mu|^2|\nu|^2(M+1) + \frac{1}{SNR}},$$

where $SNR = P/\sigma^2$.

Figure 6:
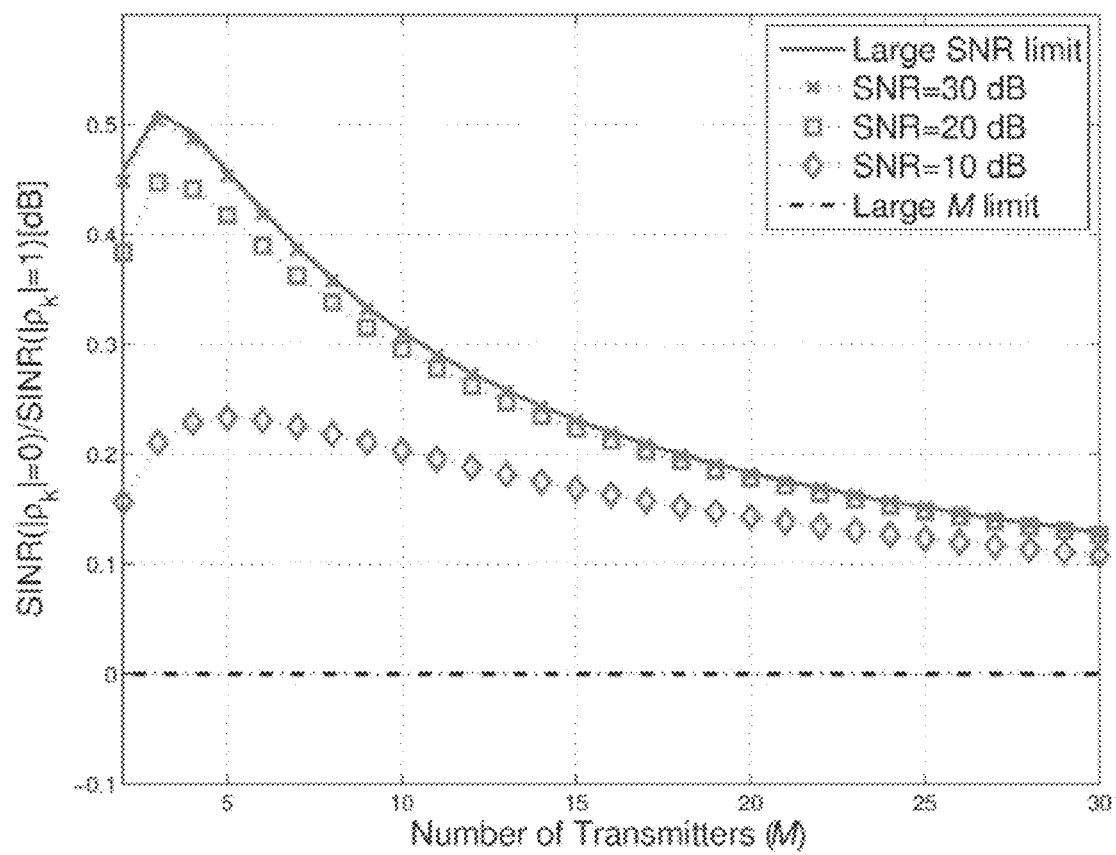
FIG. 6 illustrates a plot of ratio of the average subcarrier SINR versus M for different input SNR levels.

Referring to FIG. 6 which illustrates a plot of ratio of the average subcarrier SINR versus M for different input SNR levels. It is clear that there is at most around 0.5 dB difference between the two extremes $|\rho_k|=0$ to $|\rho_k|=1$. Hence, the effect of a subcarrier's spatial channel correlation with its image on SINR is negligible.

As the input SNR and M become large the SINR ratio converges to 1 (0 dB) as shown in FIG. 6. Since the effect of $|\rho_k|$ is small, the analysis is restricted to follow to the case where $|\rho_k|=0$, however, similar results can be easily obtained for $|\rho_k|=1$.

Now, describing the SINR Ceiling for joint TX/RX I/Q imbalance, assuming $|\rho_k|=0$ and equal I/Q imbalances at the transmitter and the receiver, it is easy to show that as SNR and M goes to infinity, then $$\lim_{SNR, M \to \infty} SINR_k \approx \frac{|\mu|^2}{|\nu|^2}. \quad (38)$$

Hence, the average subcarrier SINR reaches a ceiling due to I/Q imbalance even if the beamforming array size becomes very large.

Now, describing the SINR Ceiling for joint TX-only I/Q imbalance, assuming that there is no I/Q imbalance at the receiver, i.e., $|\delta|=1$ and $|\theta|=0$, the SINR ceiling for $|\rho_k|=0$ is given by:

$$\lim_{SNR \to \infty} SINR_k \approx \frac{|\lambda|^2 M}{|\phi|^2}. \quad (39)$$

Therefore the SINR ceiling increases linearly with the beamforming array size M.

Now, describing the SINR Ceiling for joint EX-only I/Q imbalance, assuming that there is no I/Q imbalance at the transmitter, i.e., $|\lambda|=1$ and $|\phi|=0$, the SINR ceiling is given by:

$$\lim_{SNR \to \infty} SINR_k \approx \frac{|\delta|^2}{|\theta|^2}. \quad (40)$$

which is the same irrespective of the beamforming array size M.

Now discussing the SINR analysis when the transmitter branches have different I/Q imbalance parameters, the analysis is generalized to the case of FD I/Q imbalance parameters where these parameters are allowed to be different from one TX antenna to the other. In this case, the received signal in equation (22) becomes:

$$\tilde{z}_k = \left(\delta_k \frac{x^H \tilde{\Lambda}_k x}{\|x\|} + \theta_k \frac{y^T \tilde{\Phi}_k^* x}{\|x\|}\right) \tilde{s}_k + \left(\delta_k \frac{x^H \tilde{\Phi}_{k'} y^*}{\|y\|} + \theta_k \frac{y^T \tilde{\Lambda}_{k'}^* y^*}{\|y\|}\right) \tilde{s}_{k'}^* + \tilde{e}_k \quad (41)$$

where $\delta_k$ and $\theta_k$ denote the FD I/Q imbalance parameters at the receiver whereas M×M diagonal matrices $\tilde{\Lambda}_k$ and $\tilde{\Phi}_k$ contain the transmitter I/Q imbalance parameters, both at the k-th subcarrier. An approximate SINR expression can be obtained as:

$$SINR_k \approx \frac{D_1}{I_1 + I_2 + E[\tilde{e}_k \tilde{e}_k^*]} \quad (42)$$

where $$D_1 = |\delta_k|^2 \left[ g(M) \sum_{m=1}^{M} |\tilde{\Lambda}_k(m,m)|^2 + \frac{1-g(M)}{M-1} \sum_{m=1}^{M} \sum_{\substack{m'=1 \\ m' \neq m}}^{M} \tilde{\Lambda}_k(m,m) \tilde{\Lambda}_k^*(m',m') \right] \quad (43)$$

$$I_1 = |\theta_k|^2 \left[ g(M) \sum_{m=1}^{M} |\tilde{\Lambda}_{k'}(m,m)|^2 + \frac{1-g(M)}{M-1} \sum_{m=1}^{M} \sum_{\substack{m'=1 \\ m' \neq m}}^{M} \tilde{\Lambda}_{k'}(m,m) \tilde{\Lambda}_{k'}^*(m',m') \right]$$

$$I_2 = |\delta_k|^2 \sum_{m=1}^{M} |\tilde{\Phi}_{k'}(m,m)|^2 \left[ \frac{1-|\rho_k|^2}{M} + |\rho_k|^2 g(M) \right], \text{ and}$$

$$E[\tilde{e}_k \tilde{e}_k^*] = \Psi_k(1,1). \quad (44)$$

Figure 7:
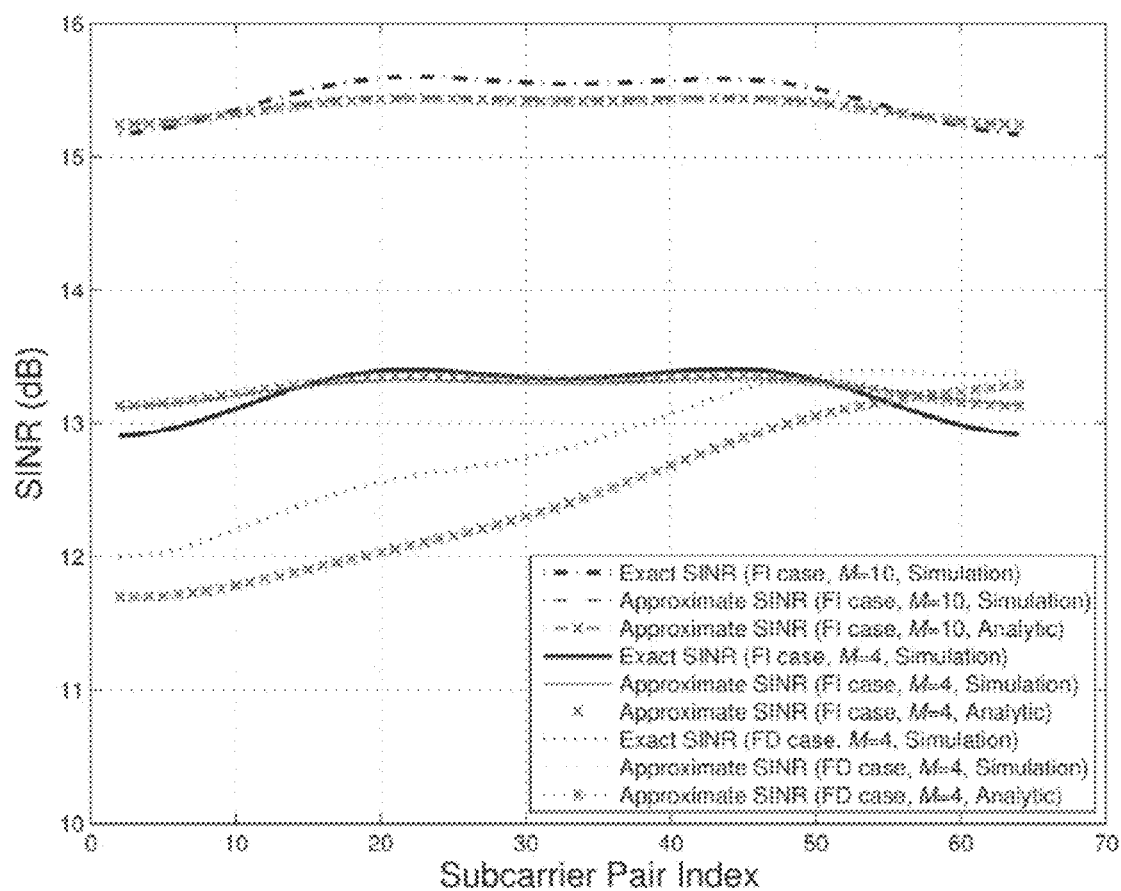
FIG. 7 illustrates a plot of the exact subcarrier SINR versus approximate SINR (both analytical and simulation based) as a function of subcarrier index when M=4 and 10 for FI I/Q imbalance and M=4 for FD I/Q imbalance.

Referring to FIG. 7 which is a plot of the exact subcarrier SINR versus approximate SINR (both analytical and simulation based) as a function of subcarrier index when M=4 and 10 for FI I/Q imbalance and M=4 for FD I/Q imbalance. A beamforming OFDM system with K=128 subcarriers, L=3-tap CIR with uniform power delay profile, and an input SNR level of 10 dB. The results shown are for M=4 and M=10 beamforming arrays at the transmitter for the FI I/Q imbalance case and M=4 for the FD I/Q imbalance case. For the FI case, an amplitude imbalance level of $\alpha_r = \alpha_t = 0.5$ dB and a phase imbalance level of $\beta_r = \beta_t = 5°$ at both ends is assumed. For the FD case, the IQ imbalance parameters are as in TX1, TX2, TX3, TX4, and RX1 of below Table III, the approximate SINR as well as the exact SINR with 10,000 trials are simulated. The simulation results for the approximate SINR are very close to the exact SINR for the FI case. For the FD case, the difference is still within 0.5 dB. Furthermore, there is an excellent match for both cases with our analytical results and with our simulation results for the approximate SINR.

Figure 8:
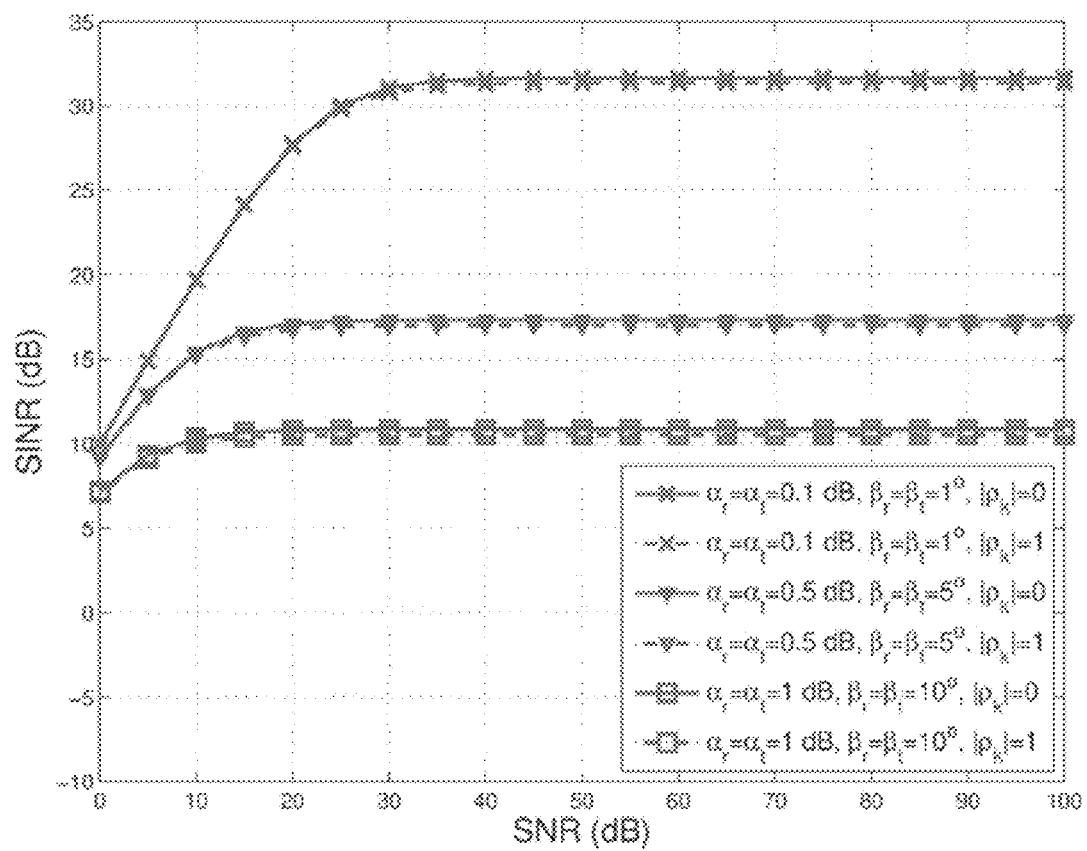
FIG. 8 illustrates a plot of average subcarrier SINR versus input SNR for different I/Q imbalance levels for $|\rho_k|=0$ and 1 assuming M=4.

Referring to FIG. 8 which illustrates a plot of average subcarrier SINR versus input SNR for different I/Q imbalance levels for $|\rho_k|=0$ and 1 assuming M=4. The variation of the average SINR for different FI I/Q imbalance levels (low, medium, and severe) and two extreme values of $|\rho_k|$ as a function of input SNR for M=4. Note that $|\rho_k|$ has little effect on SINR. In addition, it is noted that the approximation in the equation (38) accurately predicts the SINR ceilings as 32 dB, 17.7 dB and 11.2 dB for the I/Q imbalance levels in FIG. 8.

Another widely-used performance metric in industry is the error vector magnitude (EVM). In this section, the EVM at the k-th subcarrier is considered, for the received signal given by equation (22). Assuming $|\delta\lambda| \gg |\theta\phi^*|$, the received signal can be written as:

$$\tilde{z}_k \approx \|x\|\tilde{s}_k + (\delta\lambda - 1)\|x\|\tilde{s}_k + \left(\delta\phi \frac{x^H y^*}{\|y\|} + \theta\lambda^* \|y\|\right)\tilde{s}_{k'}^* + \tilde{e}_k \quad (45)$$

where $\|x\|\tilde{s}_k$ is the desired term. Then, the EVM is defined as follows:

$$EVM_k = \sqrt{\frac{E\left[\left|(\delta\lambda - 1)\|x\|\tilde{s}_k + \left(\delta\phi \frac{x^H y^*}{\|y\|} + \theta\lambda^*\|y\|\right)\tilde{s}_{k'}^* + \tilde{e}_k\right|^2\right]}{E[\|\|x\|s_k\|^2]}}$$

$$= \sqrt{\frac{|\delta\lambda - 1|^2 MP + E[B]}{MP}}$$

where B was defined in the equation (25). Furthermore, E[B] is already derived in FIG. 5 for the approximate SINR analysis. The generalization to FD I/Q imbalance, where each transmitter branch is allowed to have different I/Q imbalance parameters, is straight forward, using the above described results.

Now, derived is the throughput-maximizing linear joint transmit-receive compensation scheme in the presence of joint transmit-receive I/Q imbalance.

First, referring to noise whitening, the noise at the receiver is colored due to receiver I/Q imbalance. Assuming that an estimate of the noise auto-correlation matrix $\Psi_k$ (defined in the equation (44) and FIG. 5) is available at the receiver, the received data $z_k$ the equation (15) is passed through a noise-whitening filter to obtain:

$$n_k = [\tilde{n}_k^T \tilde{n}_{k'}^H]^T = \underbrace{\Psi_k^{-1/2} z_k}_{H_k} = \underbrace{\Psi_k^{-1/2} \Gamma_k W_k s_k}_{H_k} + \underbrace{\Psi_k^{-1/2} e_k}_{m_k} \quad (46)$$

where $m_k = [\tilde{m}_k^T \tilde{m}_{k'}^H]^T$ and $E[m_k m_k^H] = I_N$. $H_k$ can be viewed as the 2N×2M effective channel matrix of the system which includes the effects of joint TX/RX I/Q imbalance.

Next, referring to throughput-maximizing transmit beamforming under I/Q imbalance, it is assumed that the auto-correlation matrix of the transmitted symbols is given by:

$$R_{s_k} = E[s_k s_k^H] = \text{diag}(P_k(1), \ldots, P_k(2R)) \quad (47)$$

where the power levels are optimized under the constraint $\sum_{r=1}^{2R} P_k(r) \leq 2P$ where P is the symbol power per subcarrier. Defining the singular value decomposition (SVD) of $H_k$, equation (46) becomes:

$$n_k = H_k W_k s_k + m_k = U_k \Sigma_k V_k^H W_k s_k + m_k \quad (48)$$

The throughput of this beamforming system for subcarrier k and its image is given by $$T_k = \log_2(\det[H_k W_k R_{s_k} W_k^H H_k^H + I]) \quad (49)$$

$$= \log_2\left(\det\left[V_k^H W_k R_{s_k} W_k^H V_k \sum\nolimits_k^H \sum\nolimits_k + I\right]\right).$$

Using the Hadamard inequality to maximize the throughput, the 2M×2R transmit beamforming matrix $W_k$ should be optimized, under the transmit power constraint $W_k^H W_k = I_{2R}$, to make the matrix $V_k^H W_k R_{s_k} W_k^H V_k$ diagonal since the matrix $\Sigma_k^H \Sigma_k$ is already diagonal. Hence, the maximum throughput is achieved by using the transmit beamforming matrix $$W_k^{opt} = V'_k \qquad (50)$$

where $V'_k$ contains the first 2R columns of $V_k$ corresponding to its 2R largest singular values. In addition, the optimum power allocation is given by the well-known water-filling distribution:

$$P_k(r) = (\gamma - \Sigma_k^{-2}(r,r))^+ r = 1, 2, \ldots, 2r \qquad (51)$$

where $\alpha^+ = \max(0, \alpha)$ and $\gamma$ is chosen such that $\Sigma_{r=1}^{2R} P_k(r) = 2P$. Then, using (50), the received signal vector $n_k$ in (48) becomes equal to:

$$n_k = H_k V'_k s_k + m_k = \underbrace{U'_k \Sigma'_k}_{H'_k} s_k + m_k \qquad (52)$$

where $U'_k$ contains the first 2R columns of $U_k$ and $\Sigma'_k$ is the 2R×2R diagonal matrix containing the largest 2R singular values of $H_k$.

Next, referring to MMSE equalizer, to detect $s_k$, linear minimum mean square error (MMSE) filtering is applied to $n_k$ in the equation (52) to create independent parallel subcarriers. Due to the special structure (product of a unitary matrix and a diagonal matrix) of $H'_k$, the MMSE equalizer does not require a full matrix inverse, as shown below:

$$r_k = (R_{s_k}^{-1} + H_k'^H H'_k)^{-1} H_k'^H n_k \qquad (53)$$
$$= (R_{s_k}^{-1} + H_k'^H H'_k)^{-1} H_k'^H (H'_k s_k + m_k)$$
$$= (R_{s_k}^{-1} + (\Sigma'_k)^2)^{-1} (\Sigma'_k)^H U_k'^H (H'_k s_k + m_k)$$
$$= (R_{s_k}^{-1} + (\Sigma'_k)^2)^{-1} (\Sigma'_k)^2 s_k + m'_k$$

where the error vector is given by $m'_k = (R_{s_k}^{-1} + (\Sigma'_k)^2)^{-1} H_k'^H m_k$. It can be seen from the equation (53) that the optimal receiver processing consists of a beamforming matched filter matrix $U_k'^H$, which contains the left singular vectors of $H_k$ corresponding to its 2R largest singular values, followed by decoupled 1-tap MMSE frequency-domain equalization of each subcarrier and its image.

Figure 9:
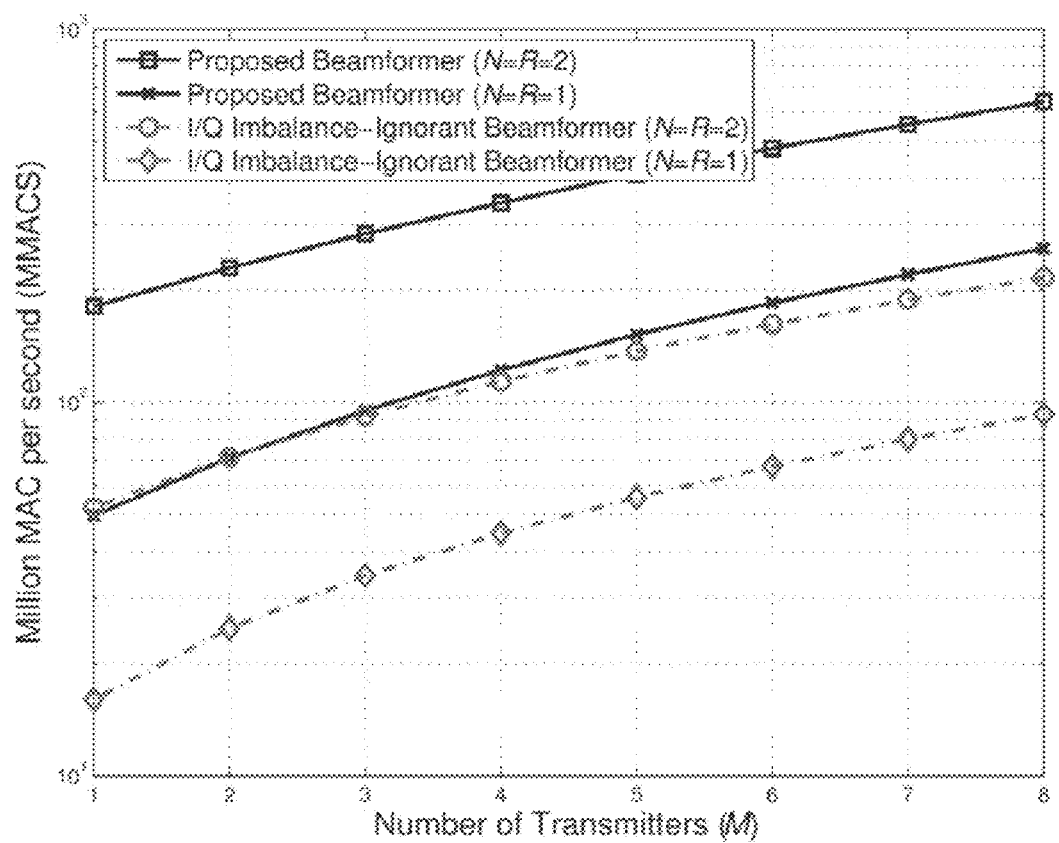
FIG. 9 illustrates a computational complexity comparison of I/Q imbalance-ignorant beamformer and the proposed beamformer for varying number of transmitters (M) when the number of subcarriers is 128, the number of receive antennas (N) is equal to 1 and 2 and for both cases, the number of beams (R) is equal to N.

Referring FIG. 9 and the below Table II to compare the complexity of the proposed beamformer and the I/Q imbalance-ignorant beamformer. The FIG. 9 illustrates a computational complexity comparison of I/Q imbalance-ignorant beamformer and the proposed beamformer for varying number of transmitters (M) when the number of subcarriers is 128, the number of receive antennas (N) is equal to 1 and 2 and for both cases, the number of beams (R) is equal to N. In the below Table II, only the operations with different complexities are listed for the two beamformers along with their multiply and accumulate (MAC) counts. Computing the SVD is performed once for each coherence time of the channel. On the other hand, TX beamforming, noise whitening, and RX MMSE equalization are performed for each OFDM symbol. FIG. 9 compares the required million MAC per second (MMACS) for the I/Q imbalance-ignorant beamformer and the proposed beamformer for the operations listed in Table II, assuming a mobile speed of 60 mph, carrier frequency of 2 GHz, FFT length of 128, subcarrier spacing of 15 kHz, and CP length of 9. With these parameters, the coherence time is 5.6 msec and the OFDM symbol duration is 71.3 μs. It is noted that the proposed beamformer is around 3 times more computationally complex than the I/Q imbalance-ignorant beamformer, however, its complexity is still well within the computational power of modern programmable DSP chips. As an example, the TI TMS320C6455-1000 DSP has a peak processing capability of 9600 MMACS.

TABLE II

|  | I/Q Imbalance-Ignorant Beamformer | Proposed Beamformer |
| --- | --- | --- |
| Computing SVD | Compute the SVD of N × M matrix for each subcarrier: $(K-2)[16N M^2 + 32N^2 M + 36N^3]$ | Compute the SVD of 2N × 2M matrix for each subcarrier pair: $(\frac{1}{2})(K-2)[128N M^2 + 256N^2 M + 288N^3]$ |
| TX Beamforming | Multiply M × R and R × 1 complex matrices for each subcarrier: $(K-2)[4M R]$ | Multiply 2M × 2R and 2R × 1 complex matrices for each subcarrier pair: $(\frac{1}{2})(K-2)[16M R]$ |
| Noise Whitening | No noise whitening required 0 | Multiply 2N × 2N and 2N × 1 complex matrices for each subcarrier pair: $(\frac{1}{2})(K-2)[16N^2]$ |
| RX MMSE Equalization | Multiply R × N and N × 1 complex matrices for each subcarrier: $(K-2)[4RN]$ | Multiply 2R × 2N and 2N × 1 complex matrices for each subcarrier pair: $(\frac{1}{2})(K-2)[16RN]$ |

Now, describing the channel and I/Q imbalance parameter estimation, the proposed joint transmit/receive beamforming scheme assumes knowledge of the effective channel matrix $H_k$ which includes the joint TX/RX I/Q imbalance effects. Next, a frequency-domain pilot-aided channel estimation method is adapted at the receiver using two consecutive pilot OFDM symbols over which the channel and I/Q imbalance parameters are assumed constant. Denote by:

$$H_{nm,k} = \begin{bmatrix} H_k(n, m) & H_k(n, m+M) \\ H_k(n+N, m) & H_k(n+N, m+M) \end{bmatrix},$$

the 2×2 effective frequency-domain channel matrix between the $m^{th}$ transmit and $n^{th}$ receive antennas which represents the direct and coupling channel gains between the $k^{th}$ subcarrier and its image. It is assumed that, during channel estimation, only one of the transmit antennas (e.g. the $m^{th}$ one) is active while the others are idle. Then, the signal at the $n^{th}$ receive antenna after noise whitening is given by (see Equation (46))

$$n_{n,k} = H_{nm,k} t_{m,k} + m_{n,k} \quad (54)$$

where $$n_{n,k} = [\tilde{n}_k(n); \tilde{n}^*_k(n)], t_{m,k} = [\tilde{t}^*_k(m)], \text{ and } m_{n,k} = [\tilde{m}_k(n); \tilde{m}^*_k(n)]$$

which can be written as follows:

$$n_{n,k} = T_{m,k} h_{nm,k} + m_{n,k}, \quad (55)$$

The training signal matrix over 1 OFDM symbol is given by:

$$T_{m,k} = \begin{bmatrix} t_{m,k}(1) & t_{m,k}(2) & 0 & 0 \\ 0 & 0 & t_{m,k}(1) & t_{m,k}(2) \end{bmatrix} \quad (56)$$

and the unknown frequency-domain channel vector for subcarrier k and its image is given by $$h_{nm,k} = \begin{bmatrix} H_{nm,k}(1,1) \\ H_{nm,k}(1,2) \\ H_{nm,k}(2,1) \\ H_{nm,k}(2,2) \end{bmatrix}. \quad (57)$$

Hence, the above two equations have 4 unknowns. Transmitting two consecutive OFDM training symbols from the $m^{th}$ transmit antenna generates two additional equations. Therefore, it suffices to estimate $H_{1m,k}$ through $H_{Nm,k}$ using the standard linear least-squares estimation (LLSE) algorithm which is selected due to its low complexity and because it does not require knowledge of the noise auto-correlation matrix. This procedure is repeated for all transmit antennas. To minimize the channel estimation error variance, it is chosen that the $t_{m,k}(1)=\sqrt{P/M}$ and $t_{m,k}(2)=\sqrt{P/M}$ for the first OFDM training symbol, while it is set $t_{m,k}(1)=\sqrt{P/M}$ and $t_{m,k}(2)=-\sqrt{P/M}$ for the second OFDM training symbol to ensure an orthogonal training matrix for all transmit antennas and subcarriers. The same transmit power during the channel estimation and data detection stages is used. The estimation of the noise auto-correlation matrix which is needed for the noise whitening operation can be performed as follows. First, the pilot-aided LLSE algorithm is used to estimate $\Gamma_k$ in the equation (15) in a manner similar to the method described above. Then, the noise auto-correlation matrix estimate is computed as the sample auto-correlation matrix of the residual error vector $\hat{e}_k = z_k - \hat{\Gamma}_k t_k$.

An OFDM system with K=128 subcarriers, M=4 transmit antennas and N=2 receive antennas is simulated. For simulation, an, Extended Vehicular A channel model is adapted. The 2-tap LPF impulse response on the I and Q branches is denoted by [1+ξ] and [1−ξ]. Then, the I/Q imbalances are specified by three parameters: amplitude imbalance $\alpha_{dB}=10 \log_{10}(1+\alpha)$, phase imbalance β in degrees, and LPF mismatch parameter ξ. Their values for the different transmit and receive antenna RF front-ends are listed in Table III below.

TABLE III

|  | ξ | β | $\alpha_{dB}$ |
|---|---|---|---|
| TX1 | 0.02 | 3° | 0.5 |
| TX2 | 0.01 | 2° | 0.4 |
| TX3 | 0.015 | 4° | 0.6 |
| TX4 | 0.02 | 3° | 0.5 |
| RX1 | 0.03 | 5° | 0.6 |
| RX2 | 0.025 | 4° | 0.65 |

Figure 10:
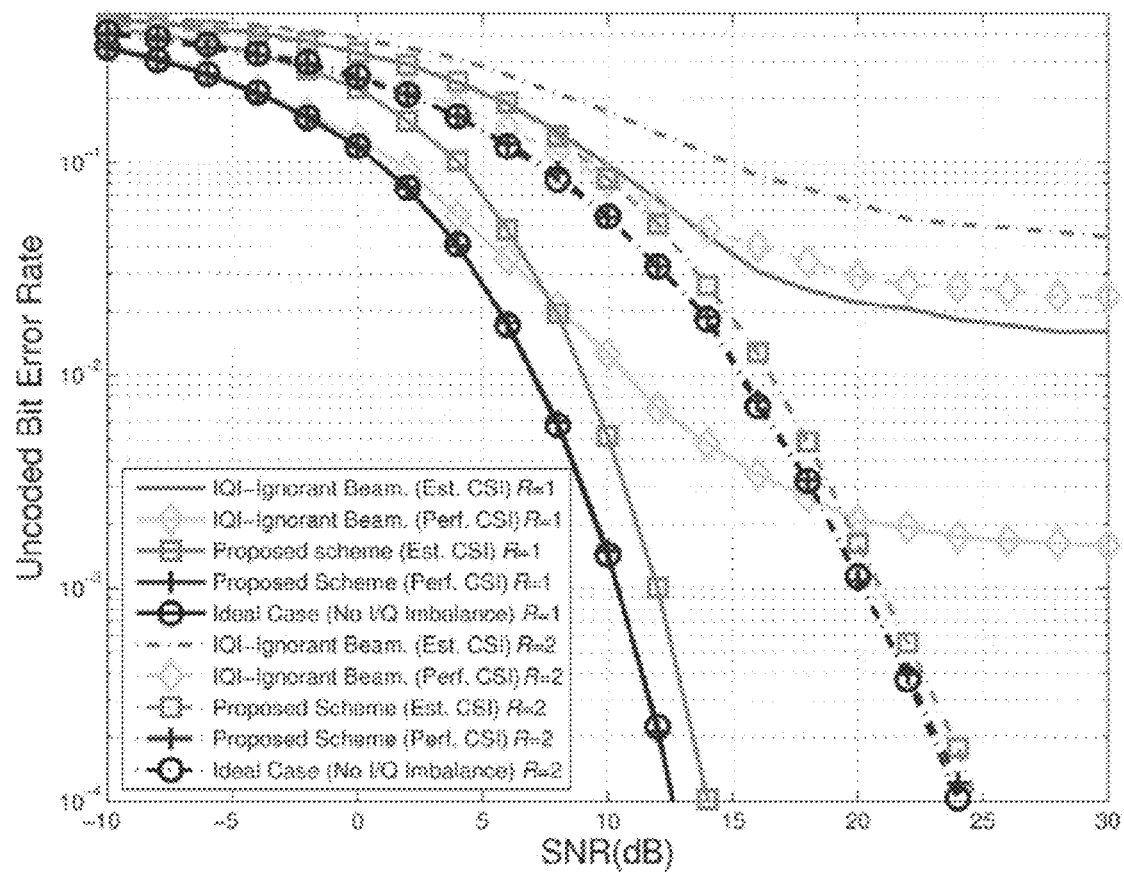
FIG. 10 illustrates an effect of I/Q imbalance on a 4×2 beamforming (both I/Q imbalance-ignorant and proposed) OFDM system assuming 16-QAM modulation for R=1 and R=2 beams per subcarrier.

Referring to FIG. 10 which illustrates an effect of I/Q imbalance on a 4×2 beamforming (both I/Q imbalance-ignorant and proposed) OFDM system. As shown in FIG. 10, the uncoded BER performance for 16-QAM modulation when the number of beams per subcarrier is equal to R=1 and R=2. The results are for the I/Q imbalance-ignorant beamformer and the proposed compensation scheme with both perfect and estimated channel state information (CSI). The I/Q imbalance-ignorant beamformer processes each subcarrier separately while the proposed scheme jointly processes each subcarrier and its image. For comparison, the BER of the ideal system with no I/Q Imbalance is also shown. The I/Q imbalance-ignorant beamformer with perfect CSI results in an error floor around $2 \times 10^{-3}$ and $2 \times 10^{-3}$ for R=1 and R=2, respectively. As expected, the I/Q imbalance-ignorant beamformer with estimated CSI performs even worse. When the proposed channel estimation and compensation schemes are used, no error floor is observed and only 1.6 dB and 0.8 dB SNR loss (from the ideal case) occurs at a raw BER of $10^{-3}$ for R=1 and R=2, respectively. Furthermore, if perfect CSI is available, the BER of the proposed compensation scheme is almost the same as that of the ideal system. Moreover, note that by increasing R, a higher data rate is achieved.

Figure 11:
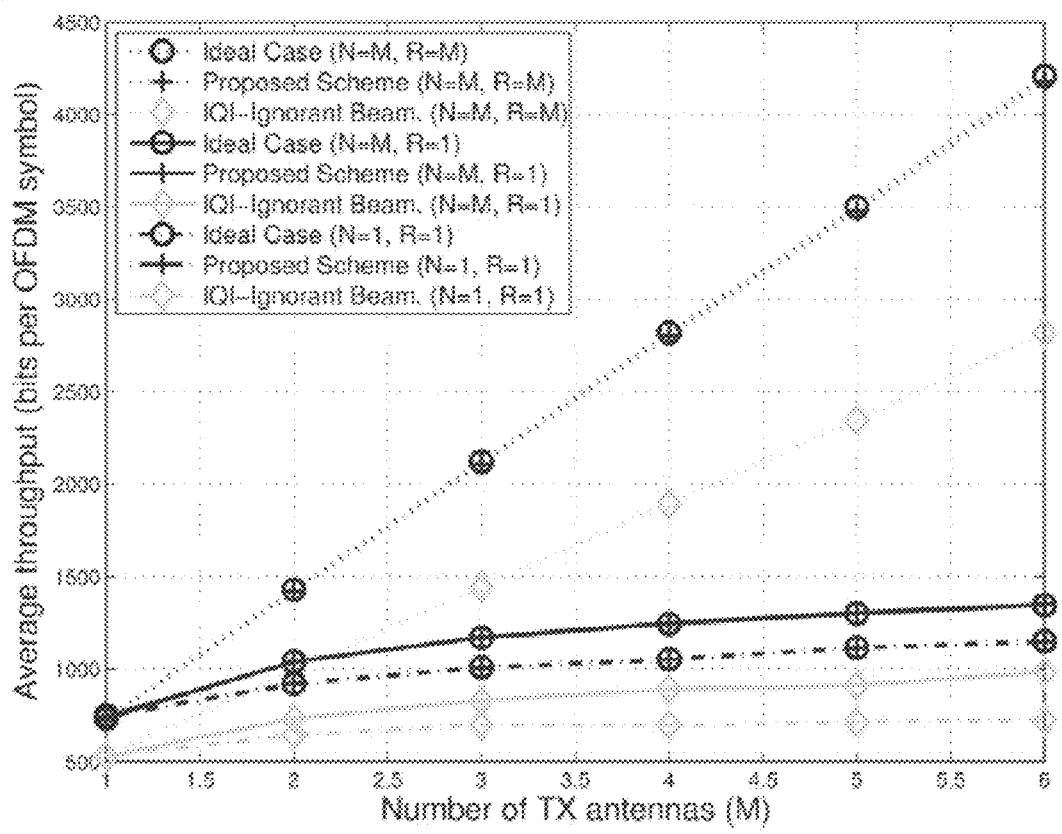
FIG. 11 illustrates an average throughput of N×M beamforming OFDM system with R number of beams for the ideal case without I/Q imbalance, proposed scheme, and I/Q ignorant beamformer for K=128 and SNR=20 dB.
Figure 12:
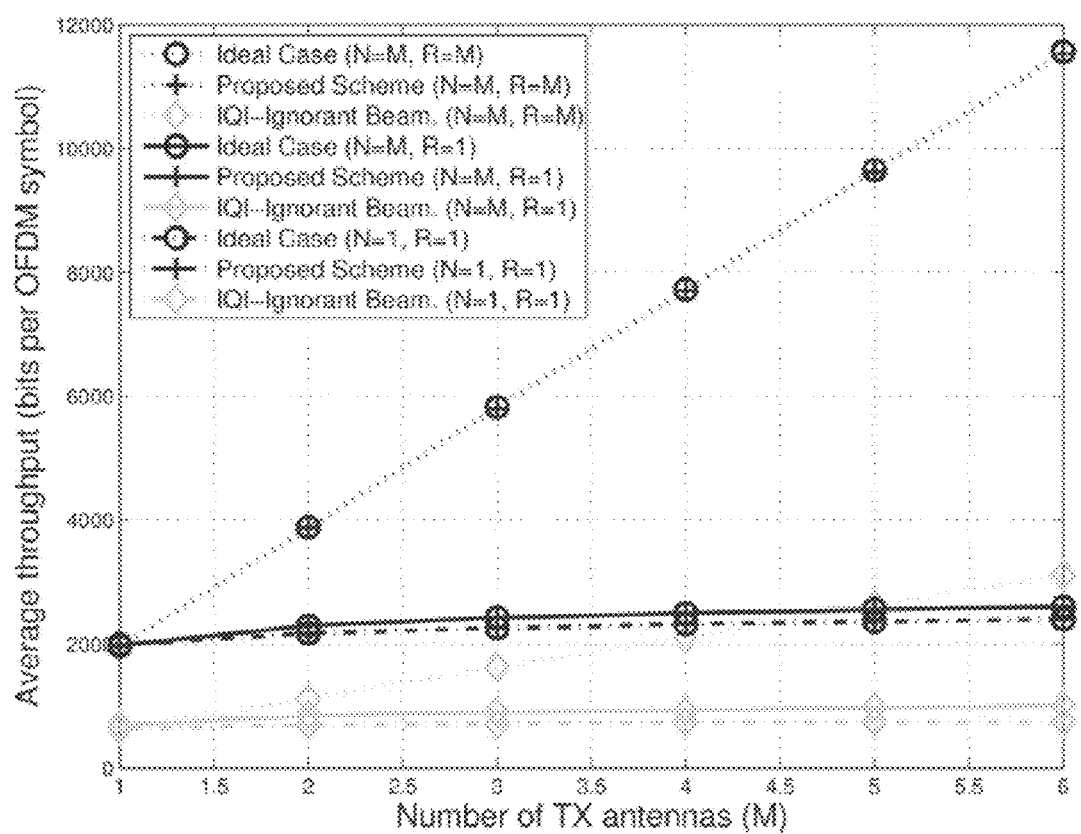
FIG. 12 illustrates an average throughput of N×M beamforming OFDM system with R number of beams for the ideal case without I/Q imbalance, proposed scheme, and I/Q ignorant beamformer for K=128 and SNR=50 dB, according to an exemplary embodiment of the present invention.

Referring to FIG. 11 which illustrates an average throughput of N×M beamforming OFDM system with R number of beams for the ideal case without I/Q imbalance, proposed scheme, and I/Q ignorant beamformer for K=128 and SNR=20 Db. The average throughput of the proposed system with the ideal case and the I/Q imbalance-ignorant beamformer for K=128 subcarriers is compared. An amplitude imbalance level of $\alpha_r = \alpha_t = 0.5$ dB and a phase imbalance level of $\beta_r = \beta_t = 5°$ at both ends is assumed. Furthermore, an L=3-tap CIR with uniform delay profile and SNR=20 dB is used in the simulations. Three scenarios are considered: (i) N=M and R=M, (ii) N=M and R=1, and (iii) N=1 and R=1. For all scenarios, the average throughput achieved by the proposed scheme is very close to the ideal case. The I/Q imbalance-ignorant beamformer has inferior average throughput compared to the proposed scheme for all three cases. As shown in FIG. 11, the average throughput comparison for a high SNR level of SNR=50 dB where the throughput gap between the proposed scheme and the I/Q imbalance-ignorant beamformer becomes much higher. Therefore, at high input SNR levels where I/Q imbalance effects dominate noise effects, the average throughput of the proposed scheme and the ideal case keep increasing with the beamforming array size M unlike the average throughput of the I/Q imbalance-ignorant beamformer.

A close analytical approximation for the average subcarrier SINR of beamforming OFDM systems in the presence of joint transmit-receive I/Q imbalance is derived. The derived expression provides new insights on the impact of the various system parameters on the performance. First, it shows that the average SINR performance variation with subcarrier index is small. Second, it demonstrates that in the presence of receive only I/Q imbalance, the SINR performance at high input SNR does not improve with the transmit beamforming array size, unlike the case of no I/Q imbalance. Third, the derived expression accurately predicts the SINR ceiling (due to receive I/Q imbalance) as the input SNR level increases. Furthermore, it is shown that, in the presence of joint TX/RX I/Q imbalance, the throughput-maximizing joint transmit/receive multiple beamforming strategy for MIMO-OFDM systems performs joint processing of each subcarrier and its image to mitigate I/Q imbalance effects. The proposed scheme eliminates the error floor in the I/Q imbalance-ignorant beamforming OFDM system due to I/Q imbalance at high SNR.

Figure 13:
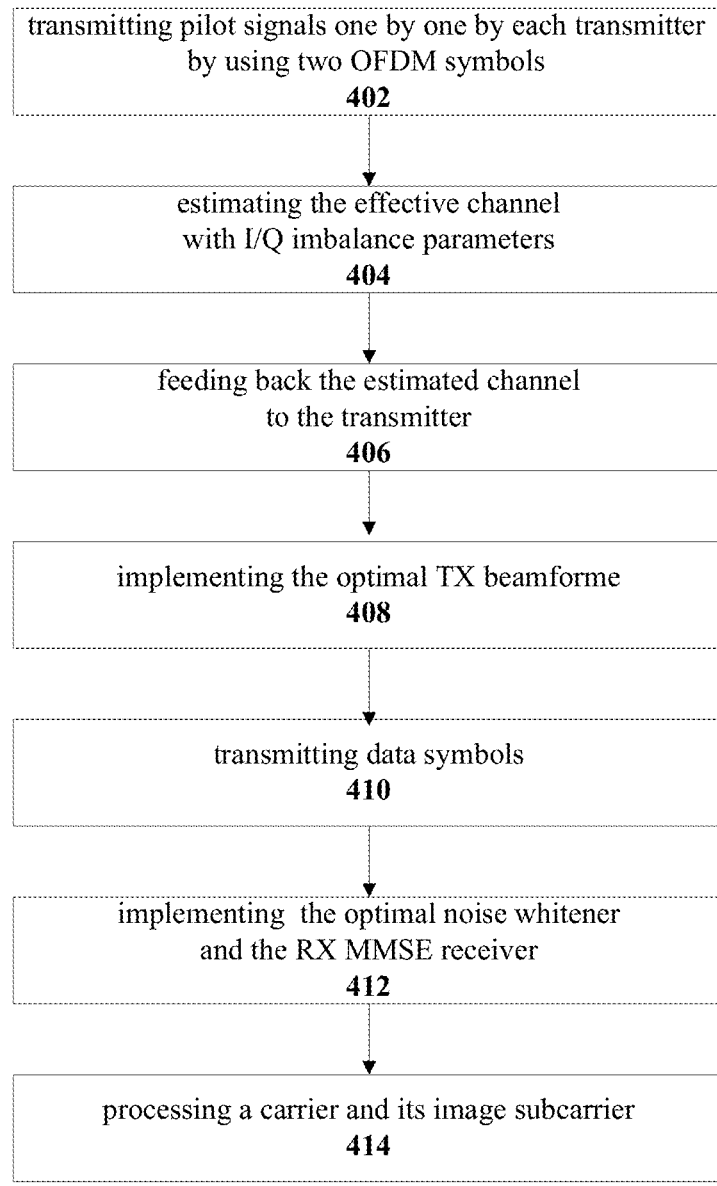
FIG. 13 is a flow diagram of a method for compensating I/Q imbalance in beamforming OFDM systems, according to an exemplary embodiment of the present invention.

FIG. 13 illustrates a flow diagram of a method 400 for compensation of I/Q imbalance in beamforming OFDM systems. The method 400 depicted in flow diagram may be executed by, for example, the system of FIG. 1 for compensation of I/Q imbalance in beamforming OFDM systems. Operations of the flowchart, and combinations of operation in the flowchart, may be implemented by various means, such as hardware, firmware, processor, circuitry and/or other device associated with execution of software including one or more computer program instructions. The operations of the method 400 are described with help of the environment and components of the present invention illustrated in FIG. 1. However, the operations of the method 400 can be described and/or practiced by using any other system.

In one embodiment, the method 400 involves estimation of I/Q imbalance parameters and thereafter the compensation of the I/Q imbalance. The method comprises the steps of: transmitting pilot signals one by one by each transmitter by using two OFDM symbols at a step 402; estimating by the receiver the effective channel with I/Q imbalance parameters at a step 404; feeding back the estimated channel to the transmitter at a step 406; implementing the optimal TX beamformer 202 at a step 408; transmitting data symbols at a step 410; implementing the optimal noise whitener 204 and the RX MMSE receiver 206 for detection of the transmitted data symbols at a step 212; and processing jointly a carrier and its image subcarrier to compensate the I/Q imbalance in the beamforming system at a step 414.

At the step 408, the transmitter uses the feedback to implement the optimal TX beamformer 202 and transmitting the data symbols. The implementation of the optimal noise whitener 204 and the RX MMSE receiver 206 at the step 212 is completed by the receiver.

The method 400 of the present invention is implemented digitally at baseband using either programmable DSP or FPGA. Computational capabilities of such digital devices make the method implementable.

The system 100 and method 400 of the present invention can be applied to multiple input multiple output (MIMO) wireless communication systems with transceivers whose analog portion has an I/Q imbalance.

The system 100 and method 400 of the present invention can be used in user handsets and base stations for cellular systems, such as, 4G LTE and LTE advanced, and WiFi systems, such as, IEEE 802.11 n/ad/ac that uses beamforming OFDM technology. The method 400 can also be used in millimeter wave systems, for example, in 60 GHz and higher carrier frequencies wherein the effects of I/Q imbalance become even more pronounced.

Also, techniques, devices, subsystems and methods described and illustrated in the various embodiments as discrete or separate may be combined or integrated with other systems, modules, techniques, or methods without departing from the scope of the present technology. Other items shown or discussed as directly coupled or communicating with each other may be coupled through some interface or device, such that the items may no longer be considered directly coupled to each other but may still be indirectly coupled and in communication, whether electrically, mechanically, or otherwise, with one another. Other examples of changes, substitutions, and alterations ascertainable by one skilled in the art, upon studying the exemplary embodiments disclosed herein, may be made without departing from the spirit and scope of the present technology.

It should be noted that reference throughout this specification to features, advantages, or similar language does not imply that all of the features and advantages should be or are in any single embodiment. Rather, language referring to the features and advantages may be understood to mean that a specific feature, advantage, or characteristic described in connection with an embodiment may be included in at least one embodiment of the present technology. Thus, discussions of the features and advantages, and similar language, throughout this specification may, but do not necessarily, refer to the same embodiment.

What is claimed is:

1. A system for compensation of in-phase/quadrature (I/Q) imbalance in a beamforming Orthogonal Frequency Divisional Multiplexing (OFDM) system, comprising:
    a transmitting (TX) beamformer configured at a transmitter end of the beamforming OFDM system;
    a noise whitener configured at a receiver end of the beamforming OFDM system;
    a receiving (RX) minimum mean square error (MMSE) receiver configured at the receiver end of the beamforming OFDM system,
    wherein the TX beamformer, the noise whitener, and the RX MMSE are capable of jointly processing a carrier and its image subcarrier to compensate the I/Q imbalance in the beamforming system; and
    an MMSE equalizer, wherein the MMSE equalizer is capable of filtering to create independent parallel subcarriers.

2. The system of claim 1, wherein the TX beamformer is in form of a precoder for the transmitted signal.

3. The system of claim 1, wherein the TX beamformer is formed by a transmitter.

4. The system of claim 1, wherein the noise whitener and the RX MMSE receiver are formed by a receiver.

5. The system of claim 1, wherein the noise whitener is capable of noise whitening at the receiver end.

6. The system of claim 1, wherein the RX MMSE receiver is capable of generating an estimate of the transmitted data symbols.

7. The system of claim 1, wherein the RX MMSE receiver in combination with TX beamformer and the noise whitener diagonalizes channel for optimal detection of the transmitted signal.

8. The system of claim 1, wherein pilot signals are sent by a transmitter with multiple antennas using two full OFDM symbols from one antenna at a time.

9. A method for compensation of in-phase/quadrature (I/Q) imbalance in a beamforming Orthogonal Frequency Divisional Multiplexing (OFDM) system, comprising the steps of:
    sending pilot signals by a transmitter with multiple antennas using two full OFDM symbols from one antenna at a time;
    estimating effective channel with I/Q imbalance parameters; feeding back the estimated channel to the transmitter; forming a transmitting (TX) beamformer by the transmitter;
    forming a noise whitener;
    forming a receiving (RX) minimum mean square error (MMSE) receiver for detection of the transmitted data symbols; and
    processing jointly a carrier and its image subcarrier to compensate the I/Q imbalance in the beamforming system; and forming an MMSE equalizer, wherein the MMSE equalizer is capable of filtering to create independent parallel subcarriers.

10. The method of claim 9, wherein a TX beamformer is configured at a transmitter end of the beamforming OFDM system.

11. The method of claim 9, wherein a noise whitener is configured at a receiver end of the beamforming OFDM system.

12. The method of claim 9, wherein a RX MMSE receiver is configured at the receiver end of the beamforming OFDM system.

13. The method of claim 9, wherein at least one of the TX beamformer, the noise whitener, the RX MMSE receiver or any combination thereof are capable of jointly processing a carrier and its image subcarrier to compensate the I/Q imbalance in the beamforming system.

14. The method of claim 9, wherein the TX beamformer is in form of a precoder for the transmitted signal.

15. The method of claim 9, wherein the noise whitener is capable of noise whitening at the receiver end.

16. The method of claim 9, wherein the RX MMSE receiver in combination with TX beamformer and the noise whitener diagonalizes channel or optimal detection of the transmitted signal.

17. A system for compensation of in-phase/quadrature (I/Q) imbalance in a beamforming Orthogonal Frequency Divisional Multiplexing (OFDM) system, comprising:
 a transmitting (TX) beamformer configured at a transmitter end of the beamforming OFDM system;
 a noise whitener configured at a receiver end of the beamforming OFDM system; and
 a receiving (RX) minimum mean square error configured at the receiver end of the beamforming OFDM system,
 wherein the TX beamformer, the noise whitener, and the RX MMSE receiver are capable of jointly processing a carrier and its image subcarrier to compensate the I/Q imbalance in the beamforming system; and
 an MMSE equalizer, wherein the MMSE equalizer applies filtering to $n_k$, which represents a received signal vector, to create independent parallel subcarriers according to equation $$n_k = H_k V'_k s_k + m_k = \underbrace{U'_k \sum_k{}'}_{H'_k} s_k + m_k$$

wherein $s_k$ is a vector from a subcarrier k according to equation 2R×1, where R is a number of beams,
 wherein $H_k$ is a 2N×2M effective channel matrix of the system, wherein N represents a number of receivers and M represents a number of transmitters, and
 wherein the RX MMSE receiver in combination with the TX beamformer and the noise whitener diagonalizes a channel for optimal detection of the transmitted signal.

* * * * *